United States Patent
Okamoto et al.

(10) Patent No.: US 12,477,236 B2
(45) Date of Patent: Nov. 18, 2025

(54) IMAGING APPARATUS

(71) Applicant: Panasonic Intellectual Property Management Co., Ltd., Osaka (JP)

(72) Inventors: Wataru Okamoto, Osaka (JP); Akira Seto, Osaka (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 28 days.

(21) Appl. No.: 18/607,431

(22) Filed: Mar. 16, 2024

(65) Prior Publication Data

US 2024/0323545 A1 Sep. 26, 2024

(30) Foreign Application Priority Data

Mar. 22, 2023 (JP) ................. 2023-045722

(51) Int. Cl.
*H04N 23/80* (2023.01)
*H04N 23/62* (2023.01)

(52) U.S. Cl.
CPC ............. *H04N 23/80* (2023.01); *H04N 23/62* (2023.01)

(58) Field of Classification Search
CPC .......... H04N 23/80; H04N 23/62; H04N 5/76; G06F 16/164; G06F 11/0727; G06F 11/1448

See application file for complete search history.

(56) References Cited

U.S. PATENT DOCUMENTS

| | | | | |
|---|---|---|---|---|
| 12,086,034 | B2* | 9/2024 | Yadav | G06F 11/1461 |
| 2005/0246612 | A1* | 11/2005 | Leis | G06F 11/0727 |
| | | | | 714/763 |
| 2013/0336408 | A1 | 12/2013 | Hosokawa | |
| 2022/0414058 | A1* | 12/2022 | Maeda | G06F 16/164 |
| 2022/0415359 | A1* | 12/2022 | Mizutani | H04N 5/76 |
| 2023/0342345 | A1* | 10/2023 | Xiao | G06F 11/1448 |

FOREIGN PATENT DOCUMENTS

| | | |
|---|---|---|
| JP | 2013-258655 A | 12/2013 |
| JP | 2015-111785 A | 6/2015 |
| JP | 2016-015669 A | 1/2016 |

* cited by examiner

*Primary Examiner* — Hung H Lam
(74) *Attorney, Agent, or Firm* — Renner, Otto, Boisselle & Sklar, LLP

(57) ABSTRACT

An imaging apparatus includes an image sensor, a controller, and a user interface. The image sensor captures a subject image to generate imaging data. The controller performs repair processing to generate a moving image file from a corrupted file, the moving image file being capable of reproducing a moving image indicated by the imaging data, the corrupted file having a defect as the moving image file. The user interface inputs a user operation related to the repair processing. The controller receives a user operation selecting a specific corrupted file from one or more of corrupted files via the user interface, and performs the repair processing on the selected corrupted file in response to the user operation.

8 Claims, 17 Drawing Sheets

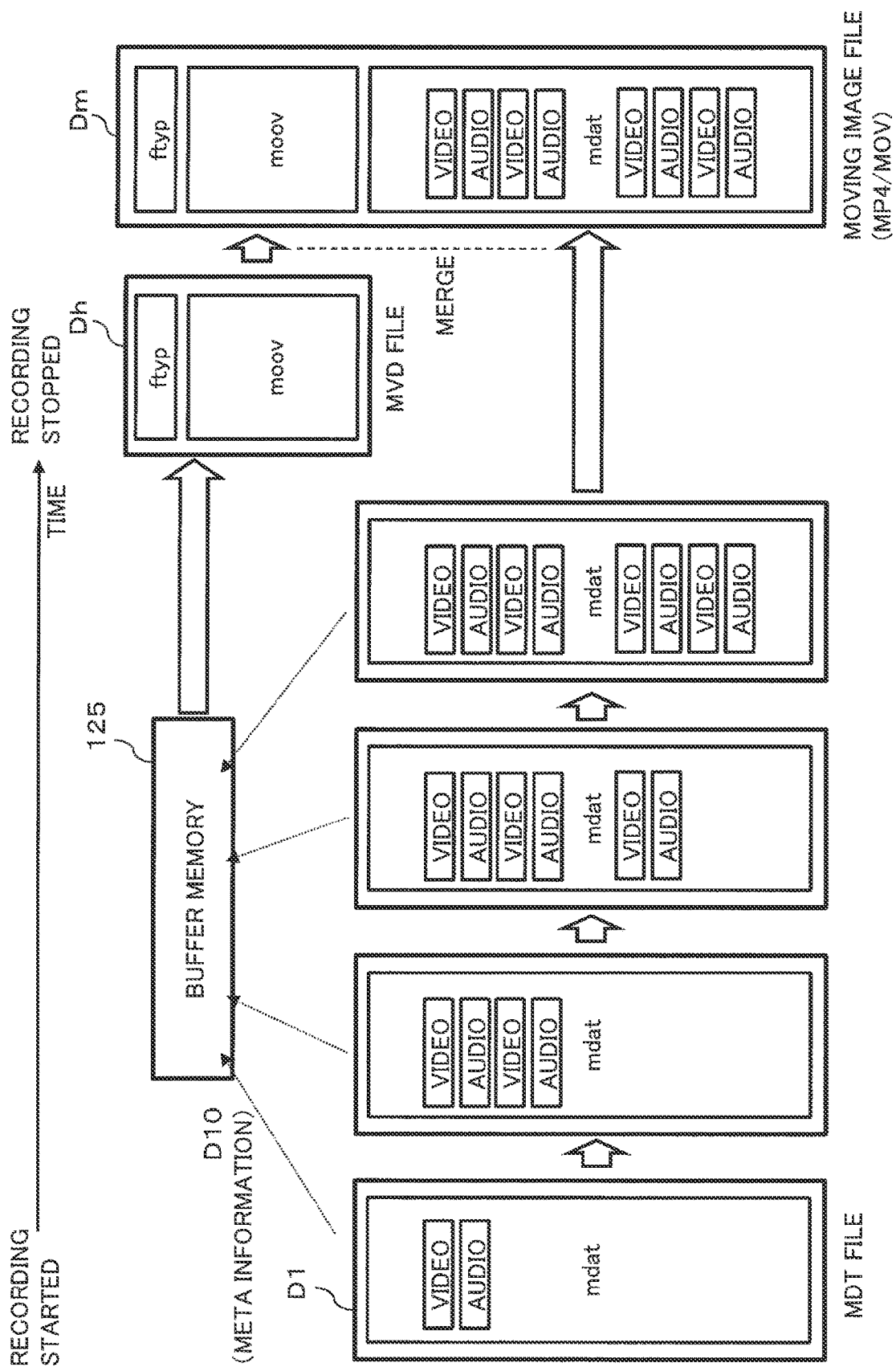

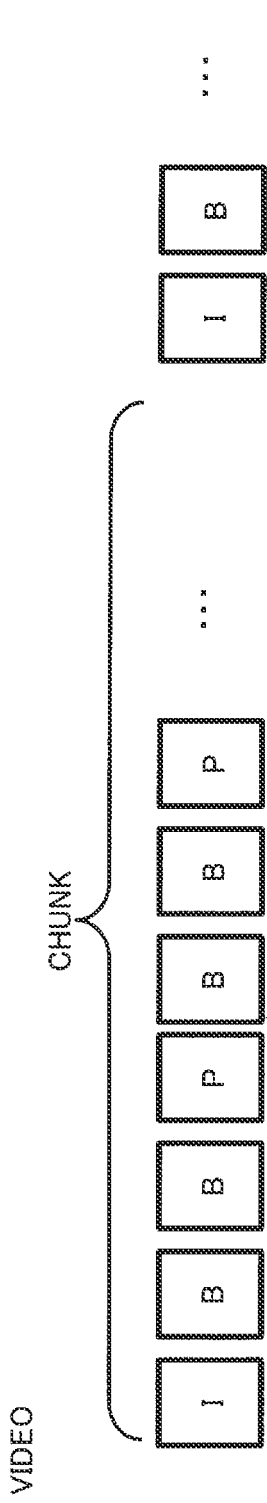
Fig. 5A  VIDEO
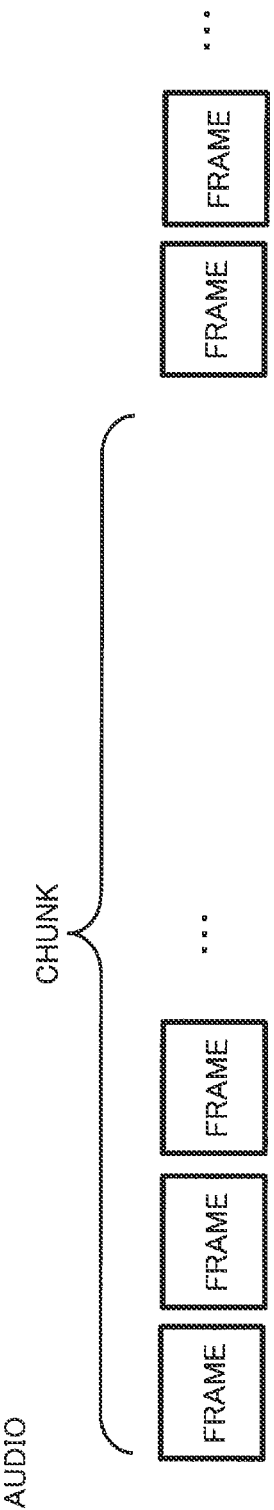
Fig. 5B  AUDIO

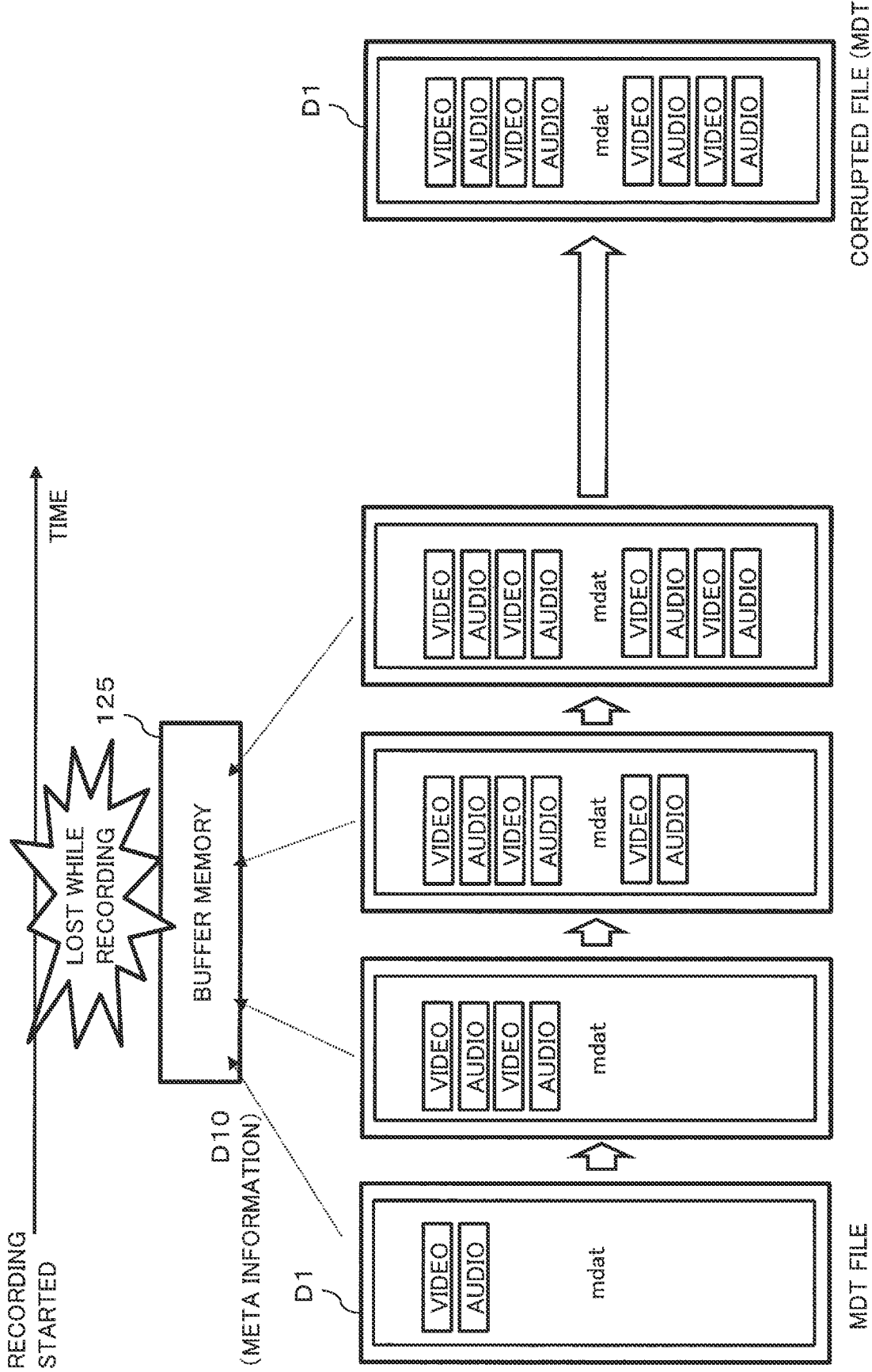

Fig. 11A
ON RECORDING
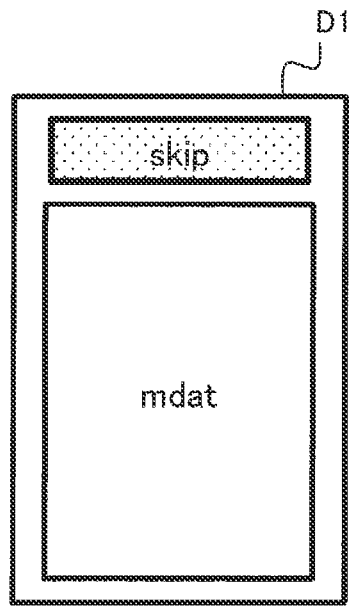
MDT FILE
Fig. 11B
RECORDING STOPPED
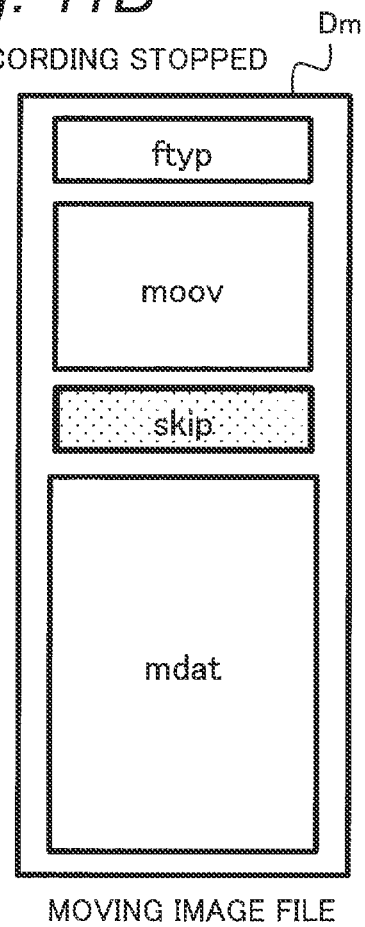
MOVING IMAGE FILE
Fig. 11C
| | |
|---|---|
| VIDEO | CONTAINER FORMAT (MOV/MP4, etc.) |
| | GOP N value (I PICTURE INTERVAL) |
| | FRAME RATE |
| | VIDEO COMPRESSION STANDARDS (H.264/H.265, etc.) |
| | IMAGE WIDTH |
| | IMAGE HEIGHT |
| | PARAMETER SET INFORMATION (VPS/SPS/PPS, etc.) |
| | BIT RATE |
| | NUMBER OF FRAMES PER CHUNK |
| AUDIO | AUDIO FORMAT (LPCM/AAC-LC, etc.) |
| | SAMPLING RATE |
| | SIZE PER SAMPLE |

IMAGING APPARATUS

TECHNICAL FIELD

The present disclosure relates to an imaging apparatus that records a moving image file on a recording medium.

BACKGROUND ART

JP 2013-258655 A discloses a digital camera that restores or creates management information necessary for reproducing a moving image file that includes data encoded by variable-length coding. An MP4 format moving image file includes, in addition to Media Data Box (mdat) for storing video coded data and audio coded data, Movie Box (moov) for storing the management information. In generation of the moving image file, the moov is generated after generation of the mdat has been completed. Therefore, if a hang-up has occurred during generation processing of the moving image file due to a machine trouble or the like, there may be a case where no moov is included in the moving image file. In this case, the moving image file cannot be reproduced although the coded data is present.

The digital camera of JP 2013-258655 A starts moving image shooting processing after having generated a dummy moov including generation rule information for use for generation of the moving image file, and includes the dummy moov in the moving image file in advance prior to completion of the mdat. With this, even if generation of the moving image file has hung up, the legitimate moov by analyzing the remaining mdat with reference to the dummy moov.

SUMMARY

The present disclosure provides an imaging apparatus capable of facilitating repair to a moving image file.

In the present disclosure, an imaging apparatus includes an image sensor, a controller, and a user interface. The image sensor captures a subject image to generate imaging data. The controller performs repair processing to generate a moving image file from a corrupted file, the moving image file being capable of reproducing a moving image indicated by the imaging data, the corrupted file having a defect as the moving image file. The user interface inputs a user operation related to the repair processing. The controller receives a user operation selecting a specific corrupted file from one or more of corrupted files via the user interface, and performs the repair processing on the selected corrupted file in response to the user operation.

According to the present disclosure, it is possible to facilitate repair to a moving image file in the imaging apparatus.

BRIEF DESCRIPTION OF DRAWINGS

FIG. 4 is a diagram for explaining a recording operation of a moving image file in the digital camera;

FIGS. 5A and 5B are diagrams for explaining a sample and a chunk in a moving image file;

FIG. 6 is a diagram for explaining a corrupted file at the time of recording a moving image in the digital camera;

FIGS. 11A to 11C are diagrams for explaining recording mode information in the digital camera of the first embodiment;

DETAILED DESCRIPTION

Hereinafter, a detailed description of an embodiment will be given with reference to drawings as appropriate. However, a detailed description more than necessary may be omitted in some cases. For example, a detailed description of a well-known item and a duplicate description for a substantially identical component may be omitted in some cases. This is to avoid an unnecessarily redundant description and to allow those skilled in the art to easily understand the following description. In addition, the inventor(s) provides the accompanying drawings and the following description in order for those skilled in the art to fully understand the present disclosure, and it is not intended to limit the subject matter described in the claims by these.

First Embodiment

In a first embodiment, a digital camera capable of capturing a subject image to record moving image data will be described as an example of an imaging apparatus according to the present disclosure.

1. Configuration

Figure 1:
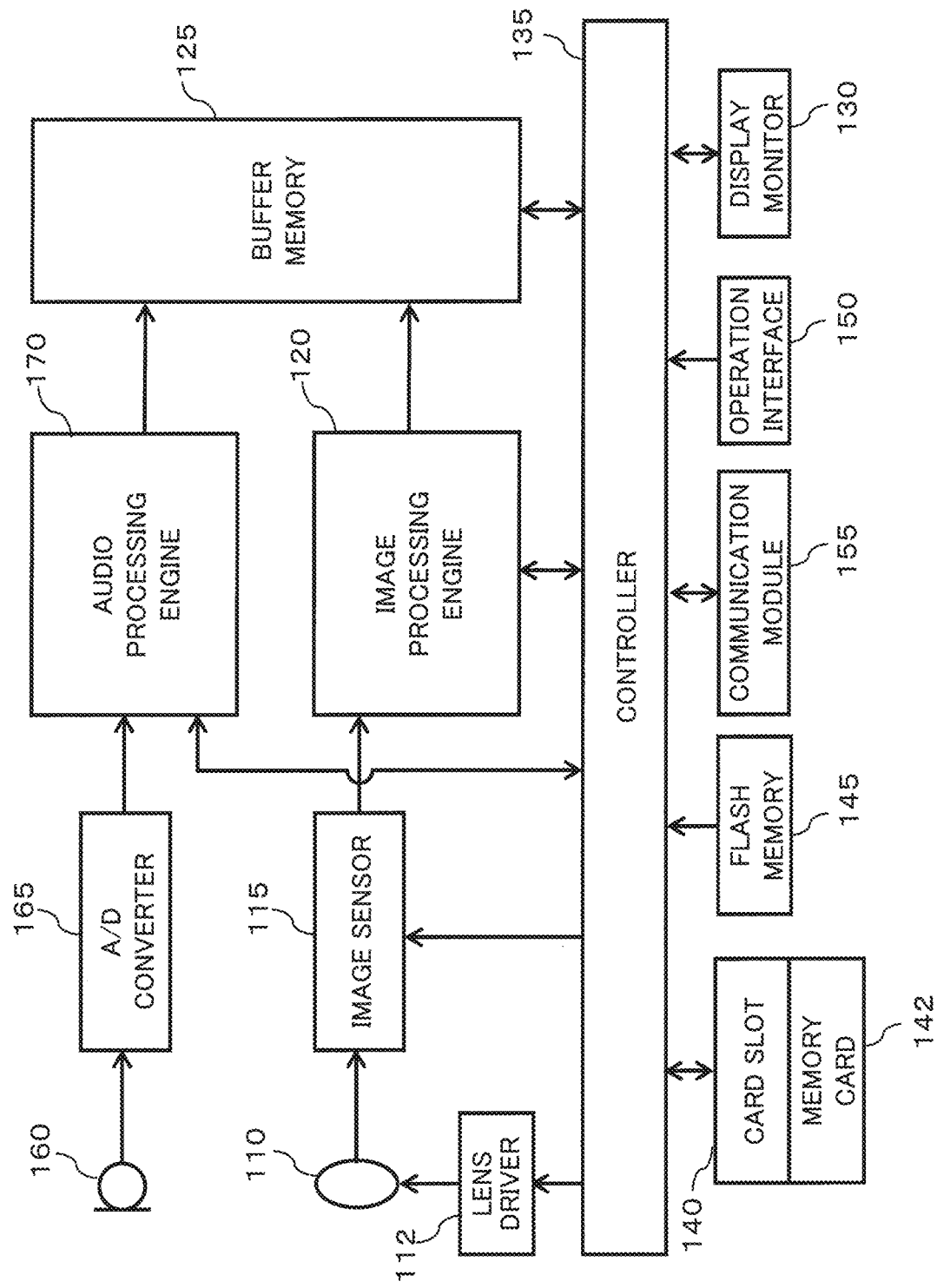
FIG. 1 is a diagram showing a configuration of a digital camera according to a first embodiment of the present disclosure.

FIG. 1 is a diagram showing a configuration of a digital camera 100 according to the present embodiment. The digital camera 100 according to the present embodiment includes an image sensor 115, an image processing engine 120, a display monitor 130, and a controller 135. Further, the digital camera 100 includes a buffer memory 125, a card slot 140, a flash memory 145, an operation interface 150, and a communication module 155. The digital camera 100 also includes a microphone 160, a microphone analog/digital (A/D) converter 165, and an audio processing engine 170.

Furthermore, the digital camera 100 includes an optical system 110 and a lens driver 112, for example.

The optical system 110 includes a focus lens, a zoom lens, an optical image stabilization lens (OIS), a diaphragm, a shutter, and the like. The focus lens is a lens for changing a focus state of a subject image formed on the image sensor 115. The zoom lens is a lens for changing a magnification of the subject image formed by the optical system. Each of the focus lens and the like includes one lens or a plurality of lenses.

The lens driver 112 drives a focus lens and the like in the optical system 110. For example, the lens driver 112 includes a motor, and moves the focus lens along an optical axis of the optical system 110, based on control by the controller 135. The configuration for driving the focus lens in the lens driver 112 can be realized by a DC motor, a stepping motor, a servo motor, an ultrasonic motor, or the like. The lens driver 112 includes a diaphragm actuator that drives a diaphragm in the optical system 110 under control of the controller 135.

The image sensor 115 captures a subject image formed via the optical system 110 to generate imaging data. The imaging data constitutes image data indicating a captured image by the image sensor 115. The image sensor 115 generates image data of a new frame at a predetermined frame rate (e.g., 30 frames/second). A generation timing of the imaging data and an electronic shutter operation in the image sensor 115 are controlled by the controller 135. As the image sensor 115, various image sensors such as a CMOS image sensor, a CCD image sensor, or an NMOS image sensor can be used.

The image sensor 115 performs an imaging operation of a moving image, a still image, a through image, or the like. The through image is mainly a moving image, and is displayed on the display monitor 130 for the user to determine a composition for imaging a still image, for example. The image sensor 115 performs various operations such as exposure and electronic shutter. The image sensor 115 is an example of an image sensor in the present embodiment.

The image processing engine 120 performs various processing on the imaging data output from the image sensor 115 to generate image data, and performs various processing on the image data to generate an image to be displayed on the display monitor 130. Examples of the various processing include, but are not limited to, white balance correction, gamma correction, YC conversion processing, electronic zoom processing, compression processing, expansion processing, and the like. The image processing engine 120 may be composed of a hard-wired electronic circuit, or may be composed of a microcomputer, a processor or the like using a program.

The display monitor 130 is an example of a display that displays various types of information. For example, the display monitor 130 displays an image (through image) that is indicated by image data captured by the image sensor 115, the image being subjected to image processing by the image processing engine 120. The display monitor 130 displays a menu screen or the like for the user to perform various settings on the digital camera 100. The display monitor 130 can be composed of a liquid crystal display device or an organic EL device, for example. The display unit such as the display monitor 130 is an example of an output interface that outputs information to be presented to the user in the present embodiment.

The operation interface 150 is a general term for hard keys and soft keys such as operation buttons and operation dials provided on the exterior of the digital camera 100, and receives an operation by a user. For example, the operation interface 150 includes a release button, a mode dial, a touch panel of the display monitor 130, a joystick, and the like. The operation interface 150 also includes virtual buttons and icons displayed on the display monitor 130. A specific example of the operation interface 150 will be described later.

The controller 135 is a hardware controller, and entirely controls the whole operation of the digital camera 100. The controller 135 includes a CPU and the like, and the CPU performs a program (software) to implement a predetermined function. The controller 135 may include, instead of the CPU, a processor including a dedicated electronic circuit designed to implement a predetermined function. That is, the controller 135 can be realized by various processors such as a CPU, an MPU, a GPU, a DSU, an FPGA, and an ASIC. The controller 135 may include one or more processors. In addition, the controller 135 may be integrated in one semiconductor chip together with the image processing engine 120 and the like.

The buffer memory 125 is a recording medium that functions as a work memory of the image processing engine 120 and the controller 135. The buffer memory 125 is realized by a DRAM (Dynamic Random Access Memory) or the like. The flash memory 145 is a non-volatile recording medium. For example, the buffer memory 125 stores various kinds of setting information in the digital camera 100.

The controller 135 may incorporate various internal memories, may incorporate a ROM, for example. The ROM stores various programs to be executed by the controller 135. In addition, the controller 135 may incorporate a RAM that functions as a work area of the CPU.

The card slot 140 is a unit into which detachable memory card 142 is inserted. The card slot 140 can electrically and mechanically connect the memory card 142, and writes and reads image data to and from the memory card 142. The memory card 142 is an external memory including a recording element such as a flash memory therein. The memory card 142 can store data such as image data generated by the image processing engine 120. In the memory card 142, moving image data photographed by the digital camera 100 is recorded.

The communication module 155 is a communication module (circuit) that performs communication conforming to the communication standard such as IEEE 802.11, the Wi-Fi standard, or the like. The digital camera 100 can communicate with other devices via the communication module 155. The digital camera 100 may directly communicate with another device via the communication module 155, or may communicate via an access point. The communication module 155 may be connectable to a communication network such as the Internet. Furthermore, the communication module 155 may include a circuit or a terminal that outputs data to another device in compliance with the USB or HDMI standard or the like. The communication module 155 may constitute an output interface in the digital camera 100.

The microphone 160 is an example of a sound collector that collects sound. The microphone 160 converts the collected sound into an analog signal that is an electric signal, and outputs the analog signal. The microphone 160 may include one or more microphone elements.

A microphone A/D converter 165 converts an analog signal from the microphone 160 into audio data of a digital signal. The microphone A/D converter 165 is an example of an audio input device. The microphone 160 may include a microphone element outside the digital camera 100. In this case, the digital camera 100 includes an interface circuit for the external microphone as the audio input device.

The audio processing engine 170 receives audio data output from an audio input device such as the microphone A/D converter 165 and performs various types of audio processing on the received audio data. The audio processing engine 170 may be implemented integrally with the image processing engine 120.

1-1. Operation Interface

Figure 2:
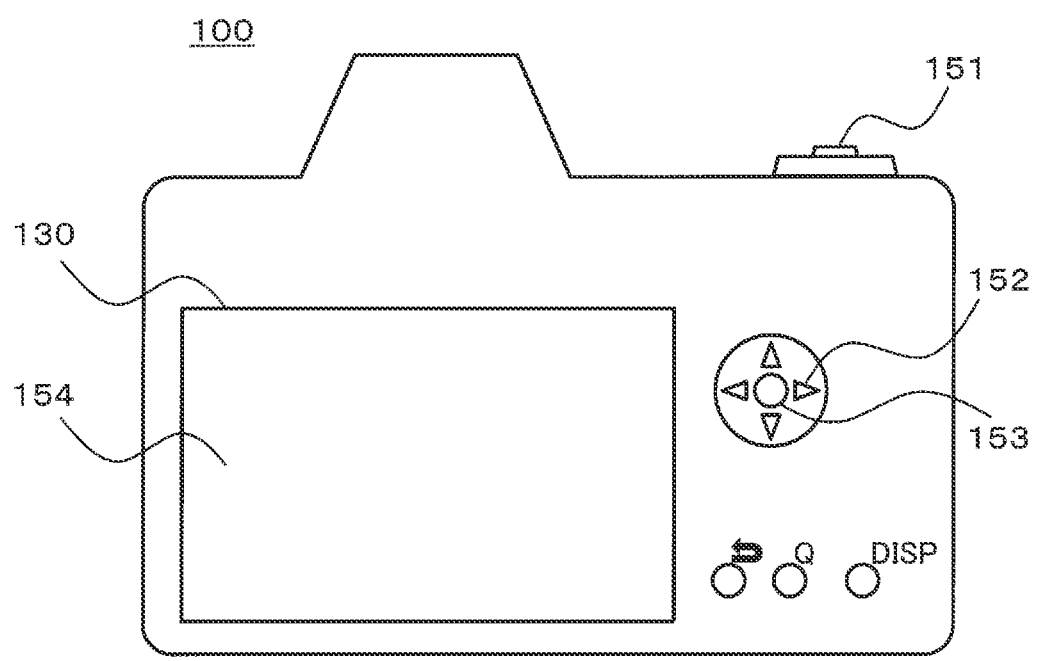
FIG. 2 is a view showing the back of the digital camera.

A specific example of the operation interface 150 will be described with reference to FIG. 2. FIG. 2 is a view showing the back of the digital camera 100.

In FIG. 2, a release button 151, selection buttons 152, a determination button 153, and a touch panel 154 are illustrated as examples of the operation interface 150. When receiving an operation by the user, the operation interface 150 transmits various instruction signals to the controller 135. The controller 135 inputs a user operation based on the instruction signal.

The release button 151 is a press-button. When the release button 151 is operated by the user, the controller 135 records, as a recorded image, image data captured at the timing of a pressing operation in the memory card 142 or the like.

The selection buttons 152 are press-buttons provided in the vertical and horizontal directions. The user can select various condition items displayed on the display monitor 130 or move a cursor by pressing one of the selection buttons 152 in the vertical and horizontal directions.

The determination button 153 is a press-button. When the user pushes the determination button 153 in a state where the digital camera 100 is in a photographing mode or a reproduction mode, the controller 135 displays a menu screen on the display monitor 130. The menu screen is a screen for setting various conditions for photographing/reproduction. In response to a determination operation in which the determination button 153 is pressed when setting items of various conditions are selected, the controller 135 determines the setting of the selected item.

The touch panel 154 is disposed overlapping with the display screen of the display monitor 130, to detect a touch operation on the display screen by the user's finger. Therefore, the user can perform operations such as various selections on the menu screen displayed on the display monitor 130.

1-2. Configuration of Moving Image File

In the digital camera 100 of the present embodiment, when moving image data is recorded in the memory card 142, file formats such as MOV and MP4 formats can be used. A configuration of a moving image file in the MOV format or the MP4 format will be described with reference to FIG. 3.

Figure 3:
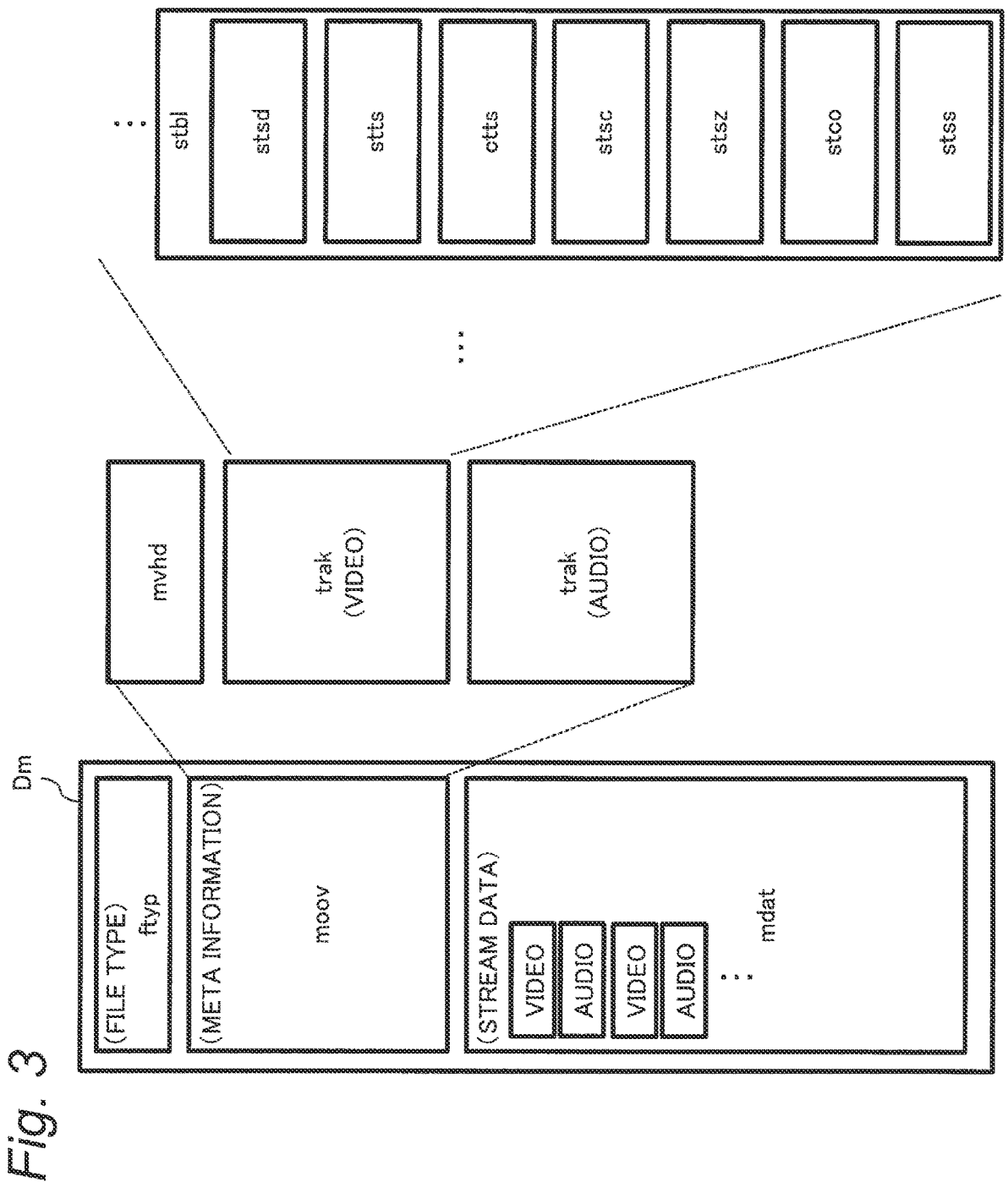
FIG. 3 is a diagram for explaining a configuration of a moving image file.

FIG. 3 is a diagram for explaining a configuration of a moving image file. In the data structure of a moving image file Dm illustrated in FIG. 3, moving image data including video and audio is stored according to the container format of MOV or MP4. The moving image file Dm includes a basic unit called a box, and has a hierarchical structure of the box. In the highest hierarchy of the moving image file Dm, a file type box (ftyp), a movie box (moov), and a media data box (mdat) are provided.

The ftyp is disposed at the head of the moving image file Dm and indicates a format to which the moving image file Dm conforms. The moov stores various kinds of header information such as meta information on the moving image file Dm. The meta information of the moving image file Dm manages information such as a frame level size of the moving image data, for example. The mdat stores encoded data obtained by encoding video and audio as stream data sequentially recorded when a moving image is photographed.

In addition to a movie header box (mvhd), track boxes (trak) of video and audio and the like are stored in the moov. For example, a hierarchy below trak of a video includes a sample table box (stbl). Information indicating how stream data is stored in the moving image file Dm is recorded in the stbl, and includes address information indicating a storage position, for example. FIG. 3 illustrates a configuration of the stbl according to the IEC_14496-12 standard. The stbl includes a plurality of boxes as described later, and is provided for each of video and audio, for example.

In the mdat, video data and audio data are alternately stored for each chunk which is a set of video and audio frames or samples. Such recording of the moving image file Dm will be described later. When the moving image file Dm is reproduced, stream data corresponding to a designated reproduction time is acquired from the mdat with reference to the meta information of the moov, for example.

The stbl includes stsd (sample descriptions), stts (decoding time to sample), ctts (composition time to sample), stsc (sample to chunk), stsz (sample sizes), stco (chunk offset), and stss (sync sample table). The stsd represents information related to a component of a sample such as a video elementary stream (ES) or an audio elementary stream (ES), the stts represents a table of decoding time and a sample number of a moving image, the ctts represents a table of decoding time and a display time, and the stsc represents the number of samples for each chunk.

The stsz represents a sample size of each sample, and is a variable or fixed value for each sample. The stco represents the offset to the chunk (i.e., a position of the chunk head in a MDT file D1), and corresponds to a value obtained for each chunk by integrating the chunk sizes up to the chunk. The scsz and stco are determined according to the MDT file D1 to be recorded, for example.

In addition, stss represents a position of an I frame that can be independently reproduced in the MDT file D1. For example, unlike the stsz and stco described above, the stsd, stts, ctts, stsc, and stss are determined from the recording mode information of the MDT file D1.

2. Operation

The operation of the digital camera 100 configured as described above will be described below.

2-1. Recording Operation of Moving Image File

An operation in which the digital camera 100 according to the present embodiment records a moving image file Dm in the memory card 142 will be described with reference to FIGS. 4, 5A and 5B.

FIG. 4 is a diagram for explaining a recording operation of a moving image file Dm in the digital camera 100. For example, in recording of a moving image, the controller 135 generates a MDT file D1, based on imaging data and audio data each obtained as stream data, and records the MDT file D1 in the memory card 142. The MDT file D1 includes the mdat.

FIGS. 5A and 5B are diagrams for explaining a sample and a chunk in a moving image file Dm. FIG. 5A illustrates samples and chunks of video. FIG. 5B illustrates samples and chunks of audio.

In the example of the video illustrated in FIG. 5A, frames of I (Intra Coded), B (Bi-directional Predictive Coded), and P (Predictive Coded) according to the use of motion compensation prediction are generated, each as one sample in a frame period of the moving image or the like, based on the imaging data. The digital camera 100 records the generated sample in the mdat in units of chunks in each of which a plurality of consecutive samples are bundled, for example. The chunk corresponds to a group of pictures (GOP) including one I frame and one or more B and P frames each, for example.

In the example of the audio illustrated in FIG. 5B, each frame is generated as one sample, based on the audio data. For example, each sample is generated with a period of 16.6 milliseconds when the audio format is advanced audio coding (AAC), or with a sampling period when the audio format is linear pulse code modulation (LPCM). For example, similarly to the video, the digital camera 100 records a plurality of consecutive samples in the mdat in units of chunks. In the digital camera 100 of the present embodiment, each chunk of video and audio is recorded in the mdat in increments of about 0.5 seconds, for example.

As illustrated in FIG. 4, the controller 135 sequentially updates the MDT file D1 by recording the video and the audio in the mdat in units of chunks in the memory card 142. Each time the MDT file D1 is updated, the digital camera 100 of the present embodiment records, in the buffer memory 125 or the like, the meta information D10 about the stream data stored in the MDT file D1. At the time of each update, only a difference from the time of the previous update may be recorded in the meta information D10, for example.

For example, the controller 135 stops recording of the moving image in response to a user operation in the operation interface 150, and generates MVD file Dh based on the latest meta information D10 held in the buffer memory 125. The MVD file Dh includes the ftyp and moov. The generated MVD file Dh is recorded in the memory card 142, for example.

The controller 135 merges the generated MVD file Dh and the latest MDT file D1 to generate a moving image file Dm, and records the moving image file Dm in the memory card 142. At the time of generating the moving image file Dm, the file name is renamed according to the MP4 format or the MOV format, for example.

2-2. Corrupted File

In recording of the moving image file as described above, when the recording operation is abnormally ended due to power failure of the digital camera 100, for example, the moving image file Dm is not generated normally, and a corrupted moving image file, that is, a corrupted file is recorded. Such a corrupted file will be described with reference to FIG. 6.

FIG. 6 is a diagram for explaining a corrupted file at the time of recording a moving image in the digital camera 100. When the power failure or the like occurs in the recording operation of the moving image in the digital camera 100, even when the MDT file D1 recorded in the memory card 142 remains, the meta information D10 held in the buffer memory 125 is lost. In this case, the MVD file cannot be generated based on the meta information D10, and the remaining MDT file D1 becomes a corrupted file in which the meta information D10 or the like is lost and cannot be reproduced.

The digital camera 100 according to the present embodiment can perform an operation to repair the above-mentioned corrupted file to be reproducible. The digital camera 100 generates a reproducible moving image file Dm, based on the MDT file D1 remaining in the memory card 142, for example.

A possible method for repairing is recording the meta information D10 in the memory card 142 every time the MDT file D1 is updated in recording the moving image. When a corrupted file is generated, repair is performed based on the meta information D10. In this method, for example, after the corrupted file is generated due to the power interruption of the digital camera 100, it is expected that, when the digital camera 100 powered up next, the corrupted file is automatically repaired associating the recorded latest meta information D10 with the corrupted file.

However, in the above method, a processing load of recording the meta information D10 in the memory card 142 increases, and processing capacity available for the imaging operation and the like would be limited. In the automatic repair by the above method, to use the meta information D10 before getting overwritten, the repair is performed immediately after the digital camera 100 is powered up. This causes a problem that next photographing cannot be performed until the repair is completed.

Therefore, the digital camera 100 according to the present embodiment performs repair on a selected corrupted file in response to a user operation selecting a specific corrupted file as a repair target. This enables the digital camera 100 to selectively perform the repair in response to the user operation even when a plurality of corrupted files are generated, and therefore to avoid use of excessive processing capacity, for example. Furthermore, enabling the user to select a corrupted file to be repaired, not necessarily immediately after the digital camera 100 is powered on, an unintended waiting time for repair can be avoided, and convenience for the user can be enhanced.

Furthermore, the digital camera 100 according to the present embodiment generates the MVD file such as the moov by analyzing the MDT file D1 remaining as a corrupted file in response to the user's selection operation, and repairs the corrupted file to the reproducible moving image file Dm. As described above, in the digital camera 100 that performs the repair according to the selection of the corrupted file, the processing load in the recording can be reduced, as compared with the above-described method where the meta information D10 used for the automatic repair is recorded in the memory card 142. This facilitates performing the imaging operation or the like of the moving image with higher image quality.

2-3. Operation of Moving Image Repair

An operation of moving image repair in which the digital camera 100 according to the present embodiment repairs a corrupted moving image file Dm will be described with reference to FIGS. 7 and 8A to 8D.

Figure 7:
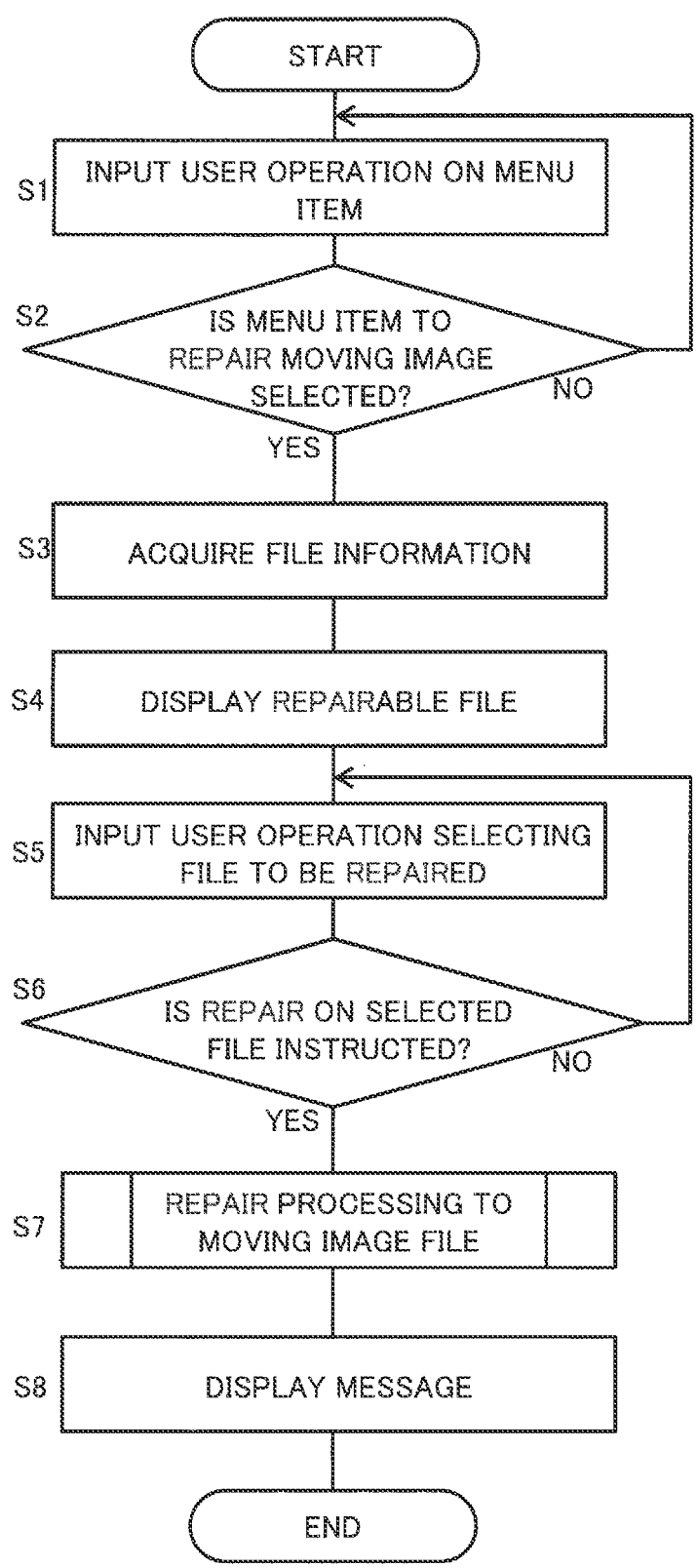
FIG. 7 is a flowchart illustrating an operation of moving image repair in the digital camera according to the first embodiment.

FIG. 7 is a flowchart illustrating the operation of moving image repair in the digital camera 100 according to the present embodiment. Each processing in this flowchart is performed by the controller 135. FIGS. 8A to 8D are diagrams for explaining the operation of moving image repair.

First, the controller 135 controls the operation interface 150 to input a user operation using a setting menu or the like for starting the operation of moving image repair (S1). FIG. 8A illustrates a display example of a setting menu screen on the display monitor 130 of the digital camera 100. For example, the controller 135 acquires a result in which a menu item on the setting menu screen (FIG. 8A) is selected by a user operation of the selection buttons 152 and determined by a user operation of the determination button 153.

The display example of FIG. 8A illustrates a state in which a tab 42 for setting various types of information regarding reproduction of an image is selected, and an icon 43 for performing setting regarding a file recorded in the memory card 142 is selected on the setting menu screen. As a menu item in this state, the display monitor 130 displays "REPAIR MOVING IMAGE" related to the operation of moving image repair.

Based on the result of the user operation acquired in step S1, the controller 135 determines whether or not the selected menu item is "REPAIR MOVING IMAGE" in the setting menu screen of FIG. 8A (S2). When the menu item for moving image repair is not selected (NO in S2), the controller 135 repeats the processing in steps S1 to S2.

When the menu item for moving image repair is selected (YES in S2), the controller 135 extracts one or more repairable corrupted files recorded in the memory card 142, and acquires file information on each corrupted file (S3). For example, the controller 135 extracts a file having an extension "MDT" in the memory card 142 as a corrupted file. The file information includes a recording start time of each file, a clip number for identifying each file, a file size of each file, and recording mode information described later, for example.

In step S3, for each extracted file, the controller 135 acquires a recording start time 61 from a creation date and time of the file, and acquires a clip number 62 from the file name, for example. Further, the controller 135 calculates an estimated value of a recording time 63, based on the file size of each file and a bit rate of the video recorded in the recording mode information of the file, for example. The recording mode information is information determined by a recording mode such as photographing setting including the bit rate and the like, and is recorded in the MDT file D1 or the like at the start of recording a moving image.

Based on the acquired file information, the controller 135 causes the display monitor 130 to display a repairable corrupted file as a option of the repair target (S4). FIG. 8B is a display example in a case where two corrupted files are stored in the memory card 142. For example, the controller 135 displays the file information for each of the corrupted files as the options on the screen of FIG. 8B (S4).

For example, when the menu item is selected and the determination operation on the setting menu screen of FIG. 8A is input by the user (YES in S1 and S2), the display monitor 130 transitions to the selection screen of the corrupted files as illustrated in FIG. 8B. In this transition, the selection screen of FIG. 8B may be displayed when the extraction of repairable files is completed after a screen transition, the screen transition being from the setting menu screen of FIG. 8A to a display screen of a message or the like indicating that the repairable files are being extracted.

In the display example of FIG. 8B, the display monitor 130 displays, in addition to "file 1" and "file 2" as options of corrupted files to be repaired, the recording start time 61, the clip number 62, and the recording time 63. According to such display of the selection screen, the user can select the file to be repaired, referring to the recording start time 61 and the like of each file.

In the example of FIG. 8B, a return icon 54 and a determination icon 55 are also displayed for the touch operation. The return icon 54 receives a user operation for returning from the menu screen displayed to a menu screen of an upper level or the like. The determination icon 55 receives a determination operation similarly to the determination button 153.

By the operation interface 150, the controller 135 inputs a user operation selecting a file to be repaired from the options of the repairable corrupted file displayed in step S3 (S5). For example, the controller 135 acquires a result in which an option on the selection screen of FIG. 8B is selected by a user operation of the selection buttons 152.

Further, the controller 135 determines whether or not a user operation instructing repair on the file selected in step S5 is input (S6). The controller 135 determines the presence or absence of such a repair instruction, based on a result of the user operation determining the selection of a corrupted file with the determination button 153 or the like, for example. When no repair instruction is input for the selected file (NO in S6), the controller 135 repeats the processing in steps S5 to S6.

When the repair instruction on the selected file (YES in S6), the controller 135 performs repair processing on the selected corrupted file (S7). The repair processing is processing to generate a reproducible moving image file Dm including the MVD file Dh, based on the MDT file D1 that becomes a corrupted file (see FIGS. 4 and 6). Details of the repair processing to a moving image file (S7) will be described later.

FIG. 8C illustrates a display example of a screen that transitions from the selection screen of FIG. 8B when a file to be repaired is selected. In the present embodiment, the controller 135 causes the display monitor 130 to display a progress bar 65 indicating a progress status of the repair processing, performing the repair processing to a moving image file (S7). For example, the controller 135 sequentially calculates an estimated value of the remaining time to complete the repair processing performing on the corrupted file, and updates the display of the progress bar 65 according to an elapsed time and the calculated remaining time. The elapsed time is a time span from a start of the repair processing to a time at the latest calculation. Details of such display processing of the repair remaining time will be described later.

Further, in the repair processing to a moving image file (S7), the controller 135 causes the display monitor 130 to display a cancel icon 56 as illustrated in FIG. 8C, for example. The cancel icon 56 receives a user operation for interrupting the repair processing. The controller 135 interrupts the repair processing being performed, in response to the user operation. According to such interruption of the repair processing, even before completion after the start of the repair processing, it is possible to perform a next photographing operation, leading to further improving the convenience of the user, for example.

When the repair processing ends for the selected corrupted file, the controller 135 causes the display monitor 130 to display a message indicating that the repair is completed, as illustrated in FIG. 8D, for example (S8). FIG. 8D illustrates a display example of a screen that transitions, in response to the end of the processing, from the screen at the time of performing the repair processing (FIG. 8C). Thereafter, the display monitor 130 may further transition to a reproduction screen of the repaired moving image file.

Furthermore, in a case where the repair processing to a moving image file (S7) is interrupted by a user operation of touching the cancel icon 56 in FIG. 8C, a message indicating the interruption of the repair processing may be displayed in step S8, for example.

After displaying the message or the like indicating completion of the repair processing (S8), the controller 135 ends the processing of this flowchart.

According to the above processing, the repairable corrupted file extracted from files in the memory card 142 is presented to the user on the display monitor 130 (S3, S4), in response to a user operation selecting the menu item for moving image repair (S1, S2). Then, in response to a user operation selecting a file to be repaired from the displayed corrupted file (S5), the repair processing to a moving image file is performed on the selected file in response to the repair instruction (S6, S7).

As described above, the repair processing to a moving image file (S7) can be selectively performed in response to the operation in which the user selects the corrupted file to be repaired. Therefore, the convenience of the user can be improved, and the excessive repair processing can be avoided. This makes it easier to repair the moving image file in the digital camera 100.

According to the above processing, for the repairable corrupted file, the recording start time 61, the clip number 62, and the recording time 63 of each file are displayed based on the acquired file information, as illustrated in the selection screen of FIG. 8B, for example (S3, S4). Therefore, the user can easily select an intended file as the repair target. In the above step S3, an example of acquiring the clip number 62 of each file in the file information is described. However, a file name may be acquired instead of the clip number 62, and the file name may be displayed in step S4.

Although the example in which two corrupted files are displayed as the options in FIG. 8B is described, one corrupted file may be displayed (S4), and a user operation selecting the one file may be input in step S5. In FIG. 8B, an example in which the file information on the plurality of corrupted files is displayed on one screen of the display monitor 130 is described. However, the file information on the plurality of files may be displayed across a plurality of screens. For example, file information of one file may be displayed for each screen. In this case, the selection of the corrupted file in step S5 may be performed in response to switching the screen by a user operation of the selection buttons 152 in the left and right directions, for example.

2-4. Repair Processing to a Moving Image File

Details of the repair processing to a moving image file in step S7 of FIG. 8 will be described with reference to FIGS. 9 to 14A and 14B.

Figure 9:
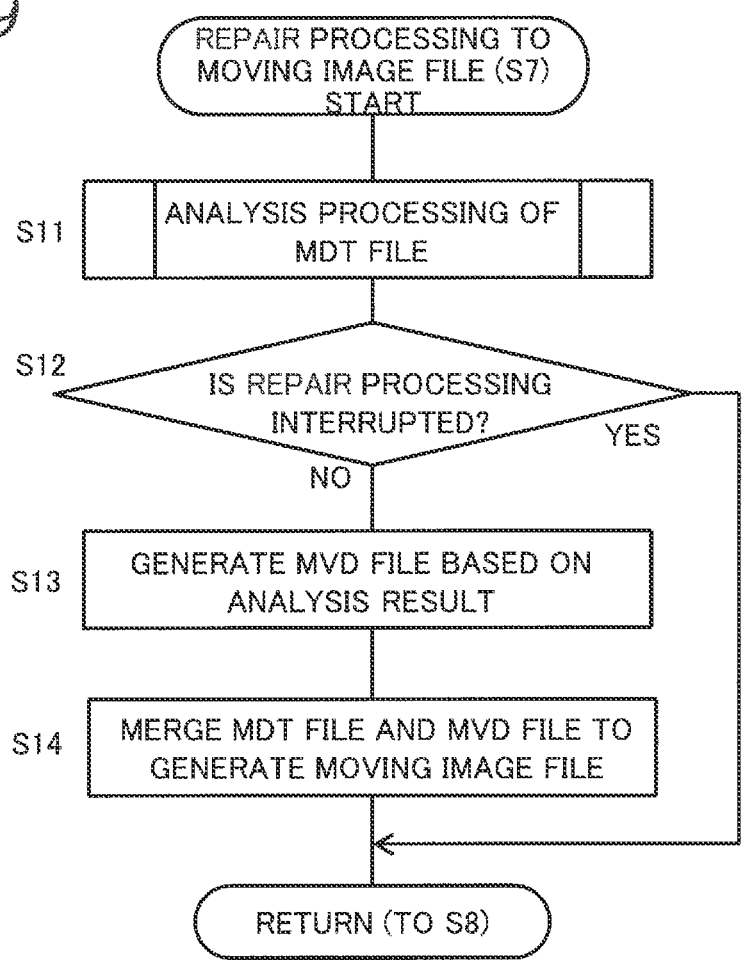
FIG. 9 is a flowchart illustrating repair processing to a moving image file in the digital camera of the first embodiment.

FIG. 9 is a flowchart illustrating the repair processing to a moving image file (S7) in the digital camera 100 according to the present embodiment. The flowchart of FIG. 9 is started when the repair is instructed on a corrupted file selected as the repair target (YES in S6).

The controller 135 analyzes the corrupted file to be repaired recorded as the MDT file D1 (S11). In the moving image file Dm without a defect, the MVD file Dh includes the moov or the like that stores the meta information D10. The controller 135 outputs information used for generating the MVD file Dh as an analysis result by analyzing the MDT file D1 in step S11, for example. Details of such analysis processing of a MDT file (S11) will be described later.

For example, the controller 135 determines whether or not the repair processing being performed is interrupted according to whether or not the analysis processing of the MDT file D1 (S11) ends in response to the user operation using the cancel icon 56 or the like in FIG. 8B (S12).

When the repair processing is not interrupted and the processing of step S11 ends after completing the analysis up to the end of the MDT file D1 (NO in S12), the controller 135 generates the MVD file Dh, based on the analysis result in step S11, for example (S13). For example, in step S13, each box under the stbl of the moov as illustrated in FIG. 3 is generated.

When generating the MVD file from the analysis result (S13), the controller 135 merges the MDT file D1 and the generated MVD file Dh to generate a moving image file Dm (S14). The controller 135 changes a file extension of the merged file according to the MP4 or MOV file format, for example.

Thereafter, the controller 135 proceeds to step S8 in FIG. 7, and causes the display monitor 130 to display the message screen indicating completion of the repair processing (FIG. 8D), for example.

On the other hand, when the repair processing is interrupted (YES in S12), the controller 135 proceeds to step S8 in FIG. 7 without performing the processing of steps S13 and S14, and displays the message or the like indicating interruption of the repair processing.

According to the above processing, the MDT file D1 recorded as the corrupted file is analyzed (S11), the MVD file Dh is generated from the analysis result (S13), and the moving image file Dm is generated by combining the MDT file D1 and the MVD file Dh (S14). As described above, the meta information and the like in the MVD file Dh are repaired from the non-reproducible MDT file D1 by the analysis, and the reproducible moving image file Dm is obtained.

2-4-1. Analysis Processing of MDT File

Details of the MDT file analysis processing in step S11 in FIG. 9 will be described with reference to FIGS. 10A, 10B and 11A to 11C.

Figure 10A:
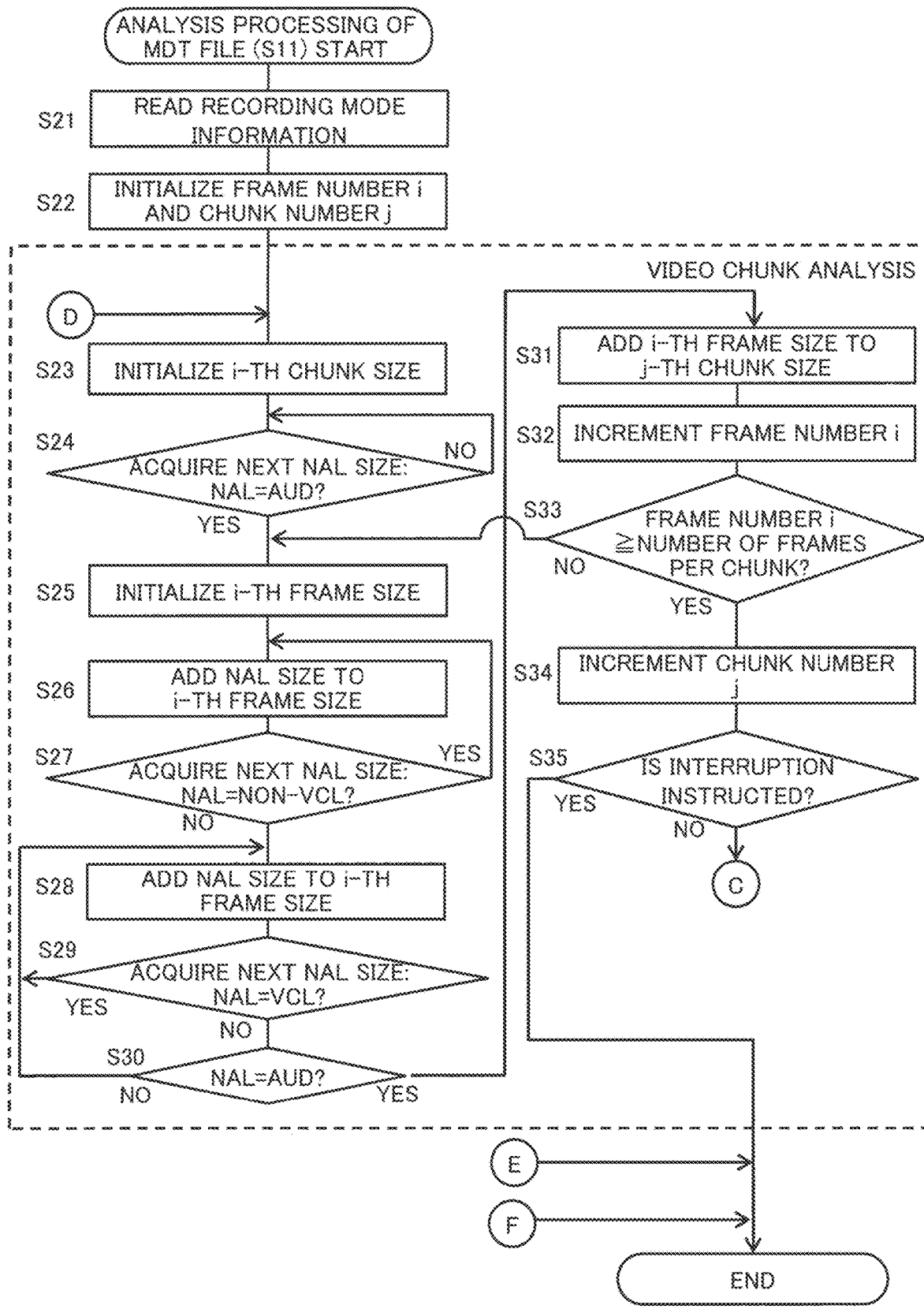
FIG. 10A is a flowchart illustrating analysis processing of a MDT file in the digital camera according to the first embodiment.
Figure 10B:
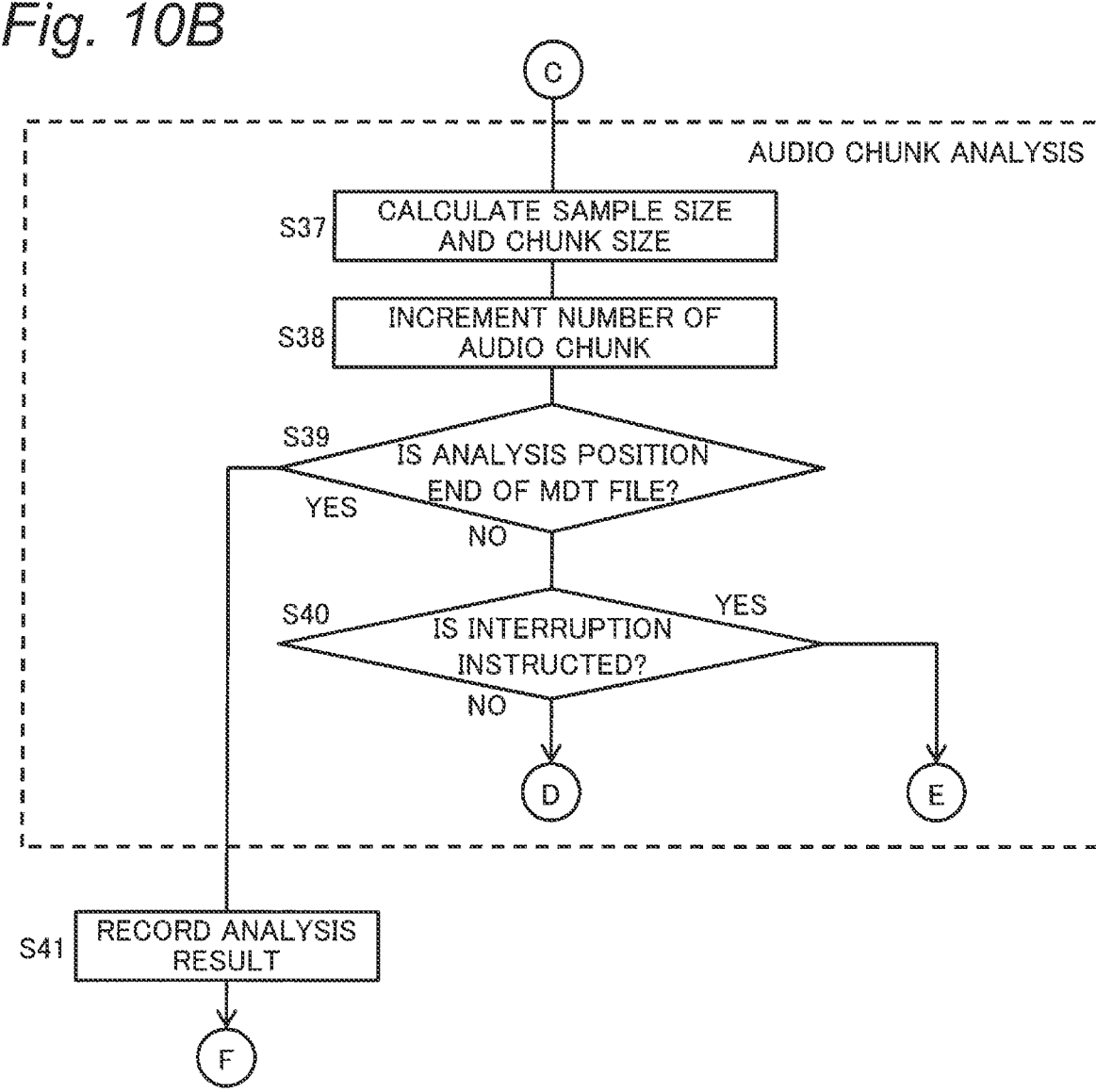
FIG. 10B is a flowchart illustrating the analysis processing of a MDT file subsequent to FIG. 10A.

FIG. 10A is a flowchart illustrating the analysis processing of a MDT file (S11) in the digital camera 100 according to the present embodiment. FIG. 10B is a flowchart illustrating analysis processing of a MDT file (S11) subsequent to FIG. 10A. The flowcharts of FIGS. 10A and 10B are started in a state where an MDT file is selected as a corrupted file to be repaired.

First, the controller 135 reads the recording mode information recorded in the MDT file D1, for example (S21). FIGS. 11A to 11C are diagrams for explaining recording mode information in the digital camera 100 of the present embodiment.

FIG. 11A illustrates an MDT file D1 with a moving image being recorded. In the present embodiment, the recording mode information is stored at the head of the MDT file D1 as a skip box (skip) as illustrated in FIG. 11A, at the start of recording a moving image, for example. In the recording operation of the moving image, the stream data of the mdat is updated.

FIG. 11B illustrates a moving image file Dm in a case where recording of the moving image is normally stopped. In the example of FIG. 11B, the moving image file Dm is generated with the skip remaining. The skip is recorded in compliance with the MP4 or MOV format, and the moving image file Dm can be reproduced with the skip remaining at the time of reproduction. The skip may also be deleted when the moving image file Dm is generated.

FIG. 11C illustrates information recorded in the skip as the recording mode information. For example, the recording mode information includes a container format corresponding to a MOV or MP4 file format, a video frame rate, parameter set information, a bit rate, the number of frames per chunk, and the like. In the example of FIG. 11C, the recording mode information further includes an audio format indicating a recording format of audio data such as LPCM or AAC, a size of one sample of the audio, and the like.

In the MDT file D1, as illustrated in FIG. 6 and the like, chunks of video and chunks of audio are alternately recorded in the mdat. In the analysis processing of a MDT file (S11), the controller 135 sequentially analyzes the mdat from a head of the data, and repeatedly performs each processing of analyzing the chunk of the video (S23 to S35) and analyzing the chunk of the audio (S37 to S40) in units of chunks.

(1) Video Chunk Analysis

First, processing of analyzing the chunk of the video (S23 to S35) will be described with reference to FIG. 10A. For example, the controller 135 initializes a frame number i and a chunk number j of the video data to zero values (S22). The frame number i and the chunk number j are variables indicating indexes of a frame (i.e., a sample) and a chunk, respectively.

For example, in an array for storing the chunk size, the controller 135 initializes a j-th chunk size, that is, a chunk size of the chunk number j to a zero value (S23). For example, at the time of the first execution of step S22, the chunk size of the chunk number "0" is initialized to "0".

In the MP4 or MOV format, stream data is managed in a hierarchical structure, and is decoded by using information included in a network abstraction layer (NAL) and the like. The NAL includes a plurality of NAL units.

The controller 135 detects a head of a next (i.e., unanalyzed) NAL unit in the MDT file D1, and acquires size information recorded in four bytes at the head of the NAL unit (S24). In step S24, a seek operation moving the read position in the MDT file D1 to the head of the NAL unit is performed as needed, for example. The controller 135 further determines whether or not the NAL unit of which the size information is acquired is an access unit delimiter (AUD) corresponding to a boundary between frames (S24).

When the NAL unit of which the size information is acquired is not AUD (NO in S24), the controller 135 seeks to the head of the next NAL unit and repeats step S24.

When the NAL unit is AUD (YES in S24), the controller 135 initializes the i-th frame size, that is, the frame size of the frame number i to a zero value in an array for storing the frame size, for example (S25). In this manner, when an analysis position in the MDT file D1 is at a head of the frame, the frame size is initialized.

The controller 135 adds the size information acquired from the NAL unit, that is, the NAL size to the frame size of the frame number i (S26).

Subsequently, the controller 135 seeks to the head of the next NAL unit and acquires the NAL size as in step S24 (S27). In step S27, the controller 135 determines whether or not the NAL unit is a unit other than a video coding layer (VCL) including coded video data, that is, whether or not the NAL unit is a non-VCL (non-VCL). Following the AUD, one or more NAL units of non-VCL and VCL are stored in one frame.

When the NAL unit is the non-VCL (YES in S27), the controller 135 repeats the processing in and after step S26 and adds the NAL size of the non-VCL to the frame size of the frame number i.

On the other hand, when the NAL unit is not the non-VCL (NO in S27), after adding the NAL size to the frame size of frame number i (S28), the controller 135 acquires the size of the next NAL unit, and determines whether or not the NAL unit is the VCL (S29).

When the NAL unit is the VCL (YES in S29), the controller 135 repeats the processing in and after step S28 and adds the NAL size of the VCL to the frame size of the frame number i.

When the NAL unit is not VCL (NO in S29), the controller 135 determines whether or not the NAL unit is AUD (S30). When the NAL unit is not AUD (NO in S30), the processing in and after step S28 is repeated again.

When the NAL unit in the analysis position advanced by the above processing is AUD (YES in S30), the controller 135 adds, to the chunk size of the chunk number j, the frame size obtained by adding the NAL sizes in one frame of the frame number i (S31).

The controller 135 increments the frame number i (S32), and determines whether or not the frame number i is equal to or larger than the number of frames in each chunk by referring to the recording mode information, for example (S33). In this manner, it is possible to determine whether or not an unanalyzed frame is left in the chunk with the chunk number j being analyzed.

When the frame number i is not equal to or larger than the number of frames in each chunk (NO in S33), the controller 135 returns to step S25 to initialize the frame size of frame number i, and repeats the subsequent processing.

On the other hand, when one chunk is analyzed and the frame number i is equal to or larger than the number of frames in each chunk (YES in S33), the controller 135 increments the chunk number j (S34).

Furthermore, the controller 135 determines whether or not a user operation for instructing interruption of repair is input by the operation interface 150, that is, whether or not the interruption is instructed, for example (S35). In the digital camera 100 of the present embodiment, the presence or absence of the interruption is determined every time one chunk is analyzed in this manner.

Figure 8:
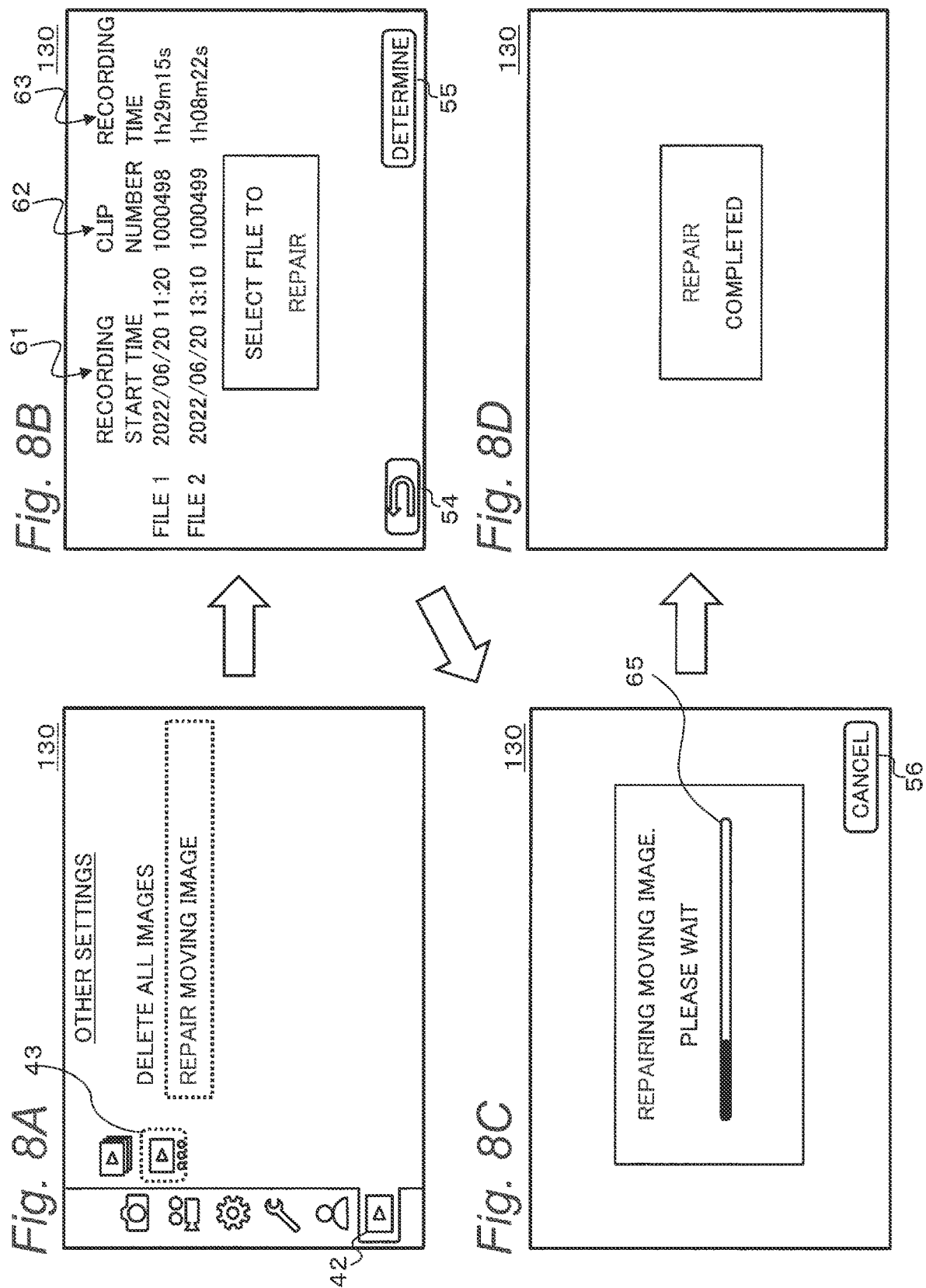
FIGS. 8A to 8D are diagrams for explaining the operation of moving image repair.

When the interruption is instructed (YES in S35), the controller 135 ends the processing of this flowchart and proceeds to step S8 of FIG. 8 (YES in S12 of FIG. 9).

On the other hand, when there the interruption is not instructed (NO in S35), the controller 135 proceeds to processing of analyzing the chunk of the audio (S37 to S40).

(2) Audio Chunk Analysis

In the flowchart of FIG. 10B, the controller 135 calculates the sample size of the audio data and the chunk size of the chunk, referring to the recording mode information, for example (S37). For example, in a case where the audio format is LPCM, based on the recording mode information, the sample size is calculated as a value obtained by multiplying the size of one channel by the number of channels, and the chunk size is calculated as a value obtained by multiplying the sample size by the number of samples for each chunk.

When one chunk is analyzed in step S37, the controller 135 increments the number of chunks of the audio (S38).

Thereafter, the controller 135 determines whether the analysis position reaches the end of the MDT file D1, that is, whether or not the MDT file D1 is analyzed up to the end, for example (S39).

When the analysis position does not reach the end of the MDT file D1 (NO in S39), the controller 135 determines presence or absence of an interruption instruction as in step S35 (S40).

When the interruption is not instructed (NO in S40), the controller 135 returns to step S23 and analyzes the chunk of the next video (S23 to S35).

On the other hand, when the interruption is instructed (YES in S40), the processing of this flowchart is ended, and the process proceeds to step S8 of FIG. 7 (YES in S12 of FIG. 9).

When the analysis position reaches the end of the MDT file D1 (YES in S39), the controller 135 records an analysis result in the memory card 142 or the like, and ends the processing of this flowchart. For example, as the analysis result, the recording mode information, the frame number i, the chunk number j, the array of a frame size, the array of a chunk size, the number of chunks of the video according to the chunk number j, the number of chunks of the audio, and the like are recorded. Thereafter, the MVD file Dh is generated from the analysis result (NO in S12, S13 in FIG. 9).

According to the above processing, reflecting that the chunks of the video and the chunks of the audio are alternately recorded in the MDT file D1, the processing of analyzing the respective chunks (S23 to S35, S37 to S40) is performed for each chunk. The processing of each analysis can be interrupted after the analysis result is recorded, according to the interruption instruction, for example (YES in S35, YES in S40, S36).

In the above processing, an example in which the sample size and the chunk size are calculated for each chunk of the audio is described (S37). For the audio data in the LPCM format, the processing similar to that in step S37 may be performed after the recording mode information is read (S21), without being limited for each chunk, and the calculated values may be recorded as the sample size and the chunk size in each chunk, for example. On the other hand, for the audio data in the AAC format, the calculation in step S37 can be performed for each chunk similarly to the processing of analyzing the chunk of the video (S23 to S35), for example.

In the above processing, an example of determining whether or not the MDT file D1 is analyzed up to the end after analyzing the chunk of the audio is described (S39). The determination may be made in the seek for acquiring the NAL size when analyzing the chunk of the video (S24 or the like). The determination may also be made at the time of reading the file or the like in the analysis processing of a MDT file, for example (S11).

2-4-2. Display Processing of Repair Remaining Time

For example, as illustrated in FIG. 8C, the digital camera 100 of the present embodiment displays a remaining time until the repair is completed on performing the repair processing to a moving image file (S7). Such display processing of the repair remaining time will be described with reference to FIGS. 12 to 14A and 14B.

Figure 12:
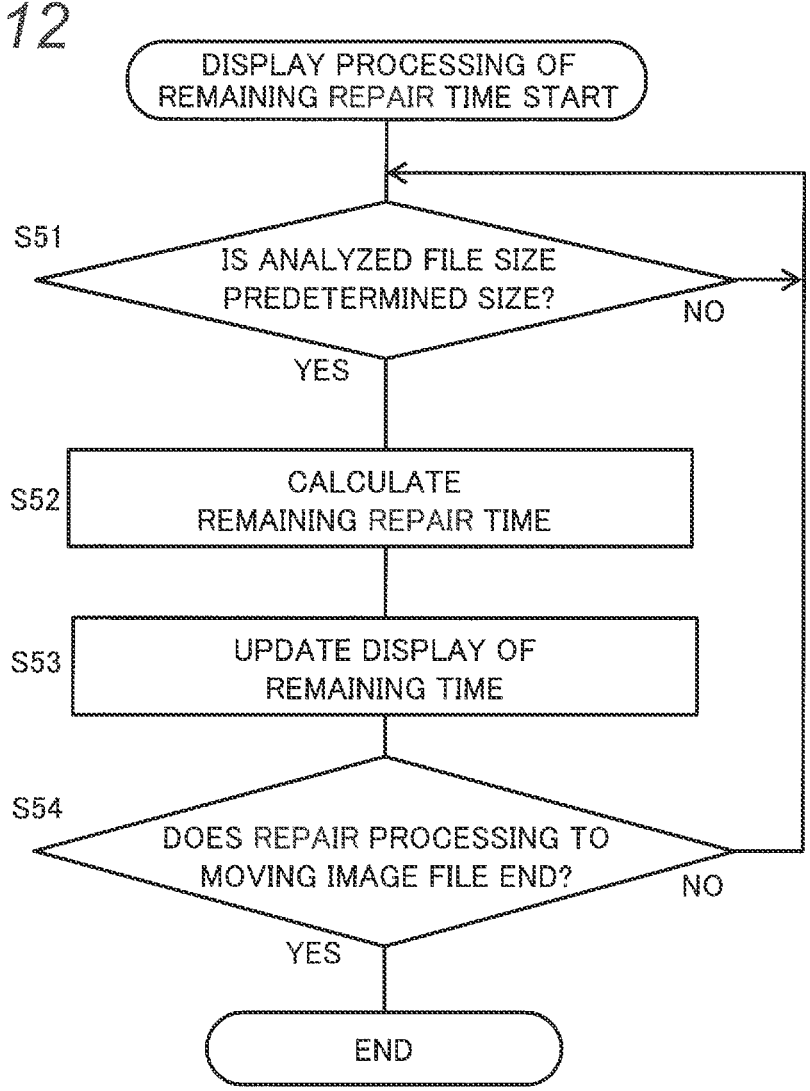
FIG. 12 is a flowchart illustrating display processing of a repair remaining time in the digital camera of the first embodiment.

FIG. 12 is a flowchart illustrating display processing of the repair remaining time in the digital camera 100 according to the present embodiment. The processing of this flowchart is performed by the controller 135 in parallel with the processing illustrated in the flowchart of FIG. 9, for example.

First, the controller 135 determines whether or not an analyzed file size in the MDT file D1 is a predetermined size, based on the analysis position in the analysis processing of a MDT file (S11) in the repair processing to a moving image file (S7), for example (S51). The predetermined size is set to a multiple of 200 megabytes (MB) from a viewpoint of enabling the display of the remaining time to be updated in a relatively short time, for example.

Figure 13A:
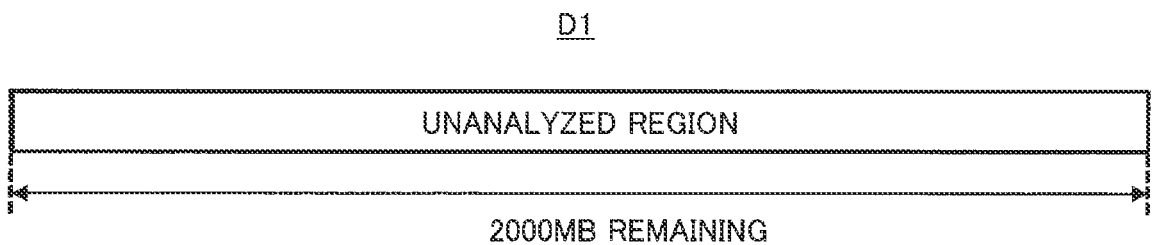
FIGS. 13A to 13C are diagrams for explaining calculation of the repair remaining time.
Figure 13B:
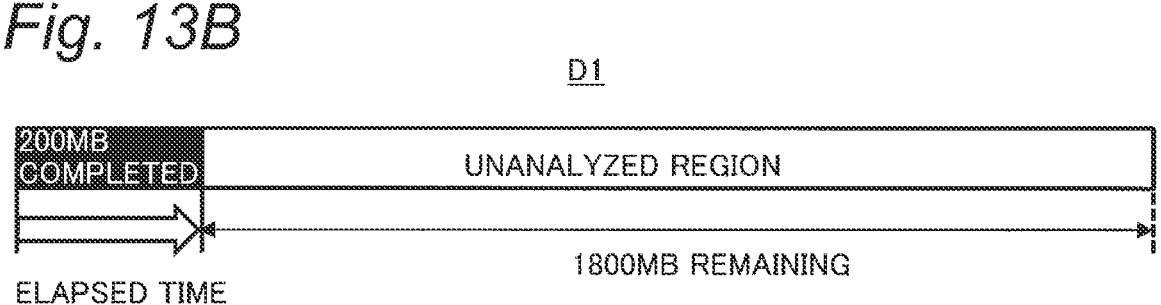
Figure 13C:
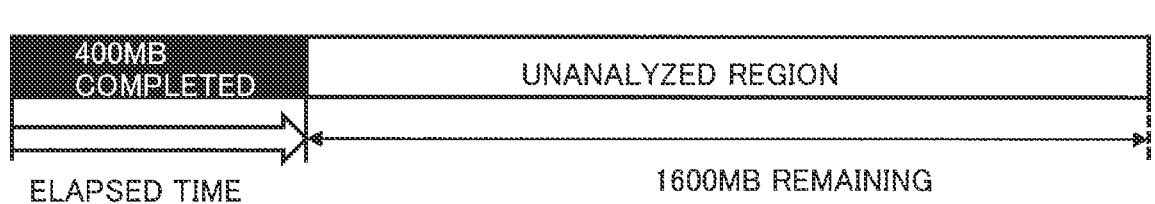

When the analyzed file size is the predetermined size (YES in S51), the controller 135 calculates the repair remaining time, based on the file size of MDT file D1 and the analyzed file size (S52). FIGS. 13A to 13C are diagrams for explaining calculation of the repair remaining time.

FIG. 13A illustrates a state in which an unanalyzed region of 2000 MB remains immediately after the analysis of the MDT file D1 is started. In this case, in step S53 described later, the progress bar 65 may be displayed in a blank state on the display monitor 130 on the screen of FIG. 8C. FIGS. 13A to 13C illustrate an example in which the MDT file D1 of 2000 MB is read from the head and analyzed.

FIG. 13B illustrates a state in which the analysis progresses by 200 MB from the head of the MDT file D1 after the state of FIG. 13A. In the example of FIG. 13B, the controller 135 calculates the repair remaining time in minutes, based on the elapsed time required for the analysis of 200 MB from the start of the analysis and a file size of unanalyzed remaining 1800 MB, for example (S52). The controller 135 acquires the analysis position and the elapsed time for each predetermined size as progress information, for example.

FIG. 13C illustrates a state in which further 200 MB is analyzed from the example of FIG. 13B. In this example, the repair remaining time is calculated based on the elapsed time to analyze 400 MB from the start of the analysis and a file size of remaining 1600 MB.

After calculating the repair remaining time (S52), the controller 135 updates the display on the display monitor 130 according to the calculated remaining time (S53). For example, in the screen of FIG. 8C, the display of the progress bar 65 is updated according to the remaining time.

Figure 14A:
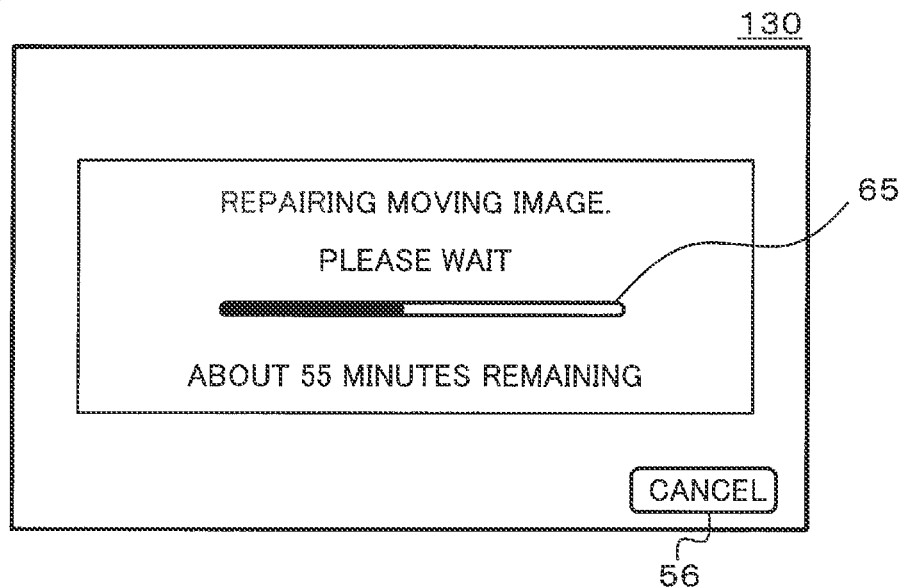
FIGS. 14A and 14B are diagrams illustrating a display example in the display processing of the repair remaining time.
Figure 14B:
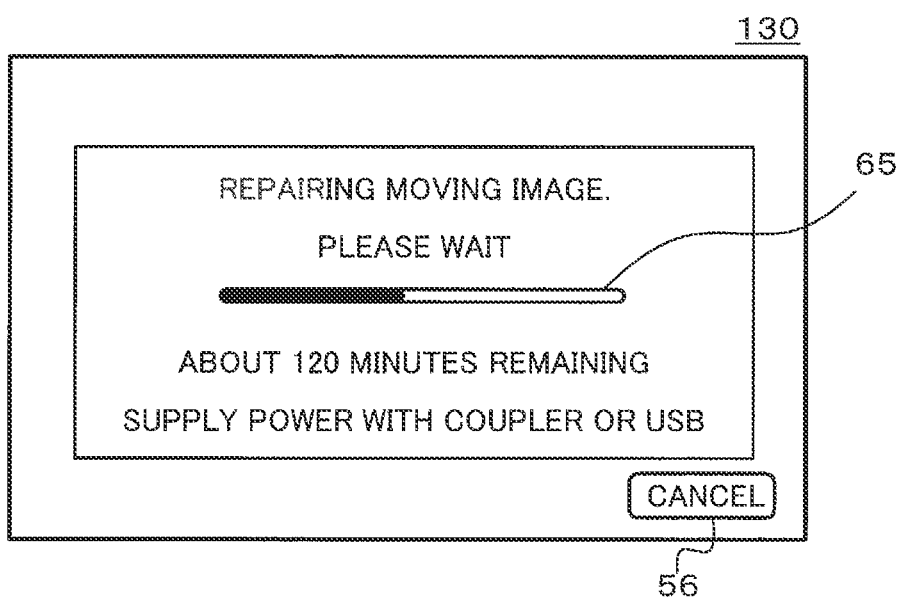

FIGS. 14A and 14B are diagrams illustrating a display example in the display processing of the repair remaining time. FIG. 14A illustrates a display example in a case where the repair remaining time is calculated in a state after FIG. 13B. In step S53, as illustrated in FIG. 14A, the controller 135 may display the calculated repair remaining time in addition to the progress bar 65 similar to that in FIG. 8C.

FIG. 14B illustrates a display example different from that of FIG. 14A. For example, in a case where it takes relatively a long time for repair, such as a case where the calculated remaining time exceeds a predetermined time, a message prompting the user to supply power to the digital camera 100 may be further displayed as illustrated in FIG. 14B.

When updating the display of the repair remaining time (S53), the controller 135 determines whether or not the repair processing to a moving image file (S7) ends (S54). When the processing (S7) does not ends (NO in S54), the controller 135 repeats the processing in and after step S51.

When the repair processing to a moving image file (S7) ends (YES in S54), the controller 135 also ends the processing of this flowchart. Thereafter, the controller 135 displays the message screen or the like of FIG. 8D in response to the end of the repair processing (S7), for example (S8 of FIG. 7).

According to the above processing, performing the repair processing to a moving image file (S7), the repair remaining time is calculated according to the progress of the analysis (S52), and the display of the repair remaining time is updated, for example (S53). According to the display of the repair remaining time, the user can easily determine whether or not to perform, using the cancel icon 56 or the like (see FIG. 8C), the operation for interrupting the repair processing in execution, for example.

3. Effects

As described above, in the present embodiment, the digital camera 100, which is an example of an imaging apparatus, includes the image sensor 115, the controller 135, and the operation interface 150 (an example of a user interface). The image sensor 115 captures a subject image to generate imaging data. The controller 135 performs the repair processing to a moving image file (S7), which is an example of repair processing generating a moving image file Dm from a MDT file D1. The moving image file Dm is capable of reproducing a moving image indicated by the imaging data. The MDT file D1 is an example of a corrupted file having a defect as the moving image file Dm. The operation interface 150 inputs a user operation related to the repair processing (S1, S5). The controller 135 receives a user operation selecting a specific corrupted file from one or more of corrupted files via the operation interface 150 (S5), and performs the repair processing on the selected corrupted file in response to the user operation (S7).

As described above, in response to the user operation selecting a specific file as the repair target from one or more of corrupted files (S5), the digital camera 100 according to the present embodiment performs the repair processing on the selected corrupted file (S7). Therefore, in the digital camera 100, the repair processing can be selectively performed on the corrupted file that the user intends to repair, and it is possible to facilitate repair to the moving image file.

Further, in the present embodiment, the controller 135 does not perform the repair processing on the corrupted file other than the corrupted file selected by the user operation (see S5 to S7). Therefore, in the digital camera 100, even when a plurality of corrupted files are generated, excessive repair processing can be avoided in response to the user operation selecting a specific corrupted file as the repair target, for example.

In the present embodiment, the digital camera 100 further includes the display monitor 130 as an example of a display that displays information. In response to a predetermined menu operation in the operation interface 150 (S1, S2), the controller 135 acquires file information on each corrupted file (S3) from the memory card 142 (an example of a recording medium) in which one or more of corrupted files are stored, and causes the display monitor 130 to display the acquired file information (S4). Therefore, the user can check a corrupted file to be repaired at a desired timing in response to the menu operation, leading to facilitating repair to the moving image for the user, for example.

In the present embodiment, the controller 135 receives the user operation selecting the specific corrupted file via the operation interface 150, with the acquired file information being displayed on the display monitor 130 (S4, S5). Therefore, the file information can be presented to the user to facilitate selecting the corrupted file to be repaired.

In the present embodiment, the file information includes at least one of the recording start time 61, the recording time 63, the clip number 62 which are respectively examples of a recording start time, an identification number, and a file name of the corrupted file (see FIG. 8B). According to such a display of the file information, the user can easily designate a corrupted file from options of the repair target.

In the present embodiment, the digital camera 100 further includes the display monitor 130 as an example of a display that displays information. On performing the repair processing on the specific corrupted file (S7), the controller 135 causes the display monitor 130 to display the repair remaining time (see FIGS. 8C, 14A and 14B) as an example of information indicating an execution time of the repair processing (S51 to S54). Therefore, the user can check the repair remaining time when the repair processing is in execution, and user convenience can be improved.

In the present embodiment, on performing the repair processing on the specific corrupted file (S7), the controller 135 receives a user operation instructing interruption of the repair processing via the operation interface 150, and interrupts the repair processing on the specific corrupted file in response to the user operation instructing the interruption (S35, S40, S12). Therefore, even when the repair processing is once started, the repair processing can be interrupted by the user operation before completion and a photographing operation can be performed, for example. Thus, it is possible to further facilitate repair to the moving image file for the user.

In the present embodiment, the defect in the corrupted file is corruption in the MVD file Dh including the ftyp and the moov each as an example of the management information used for reproducing the moving image (see FIGS. 3, 4, and 6). The controller 135 performs the repair processing on the corrupted file (S7) by generating the MVD file Dh, based on the MDT file D1 as an example of the corrupted file (S11, S13). Consequently, the reproducible moving image file Dm can be generated using the MVD file Dh (S14).

Second Embodiment

In the first embodiment, the digital camera 100 capable of interrupting the repair processing in the repair processing to a moving image file (S7) is described. A second embodiment describes a digital camera 100 further capable of restart to start the interrupted repair processing from a state at the time of interruption.

Hereinafter, description of the same configuration and operation as those of the digital camera 100 according to the first embodiment will be omitted as appropriate, and the digital camera 100 according to the present embodiment will be described.

Figure 15:
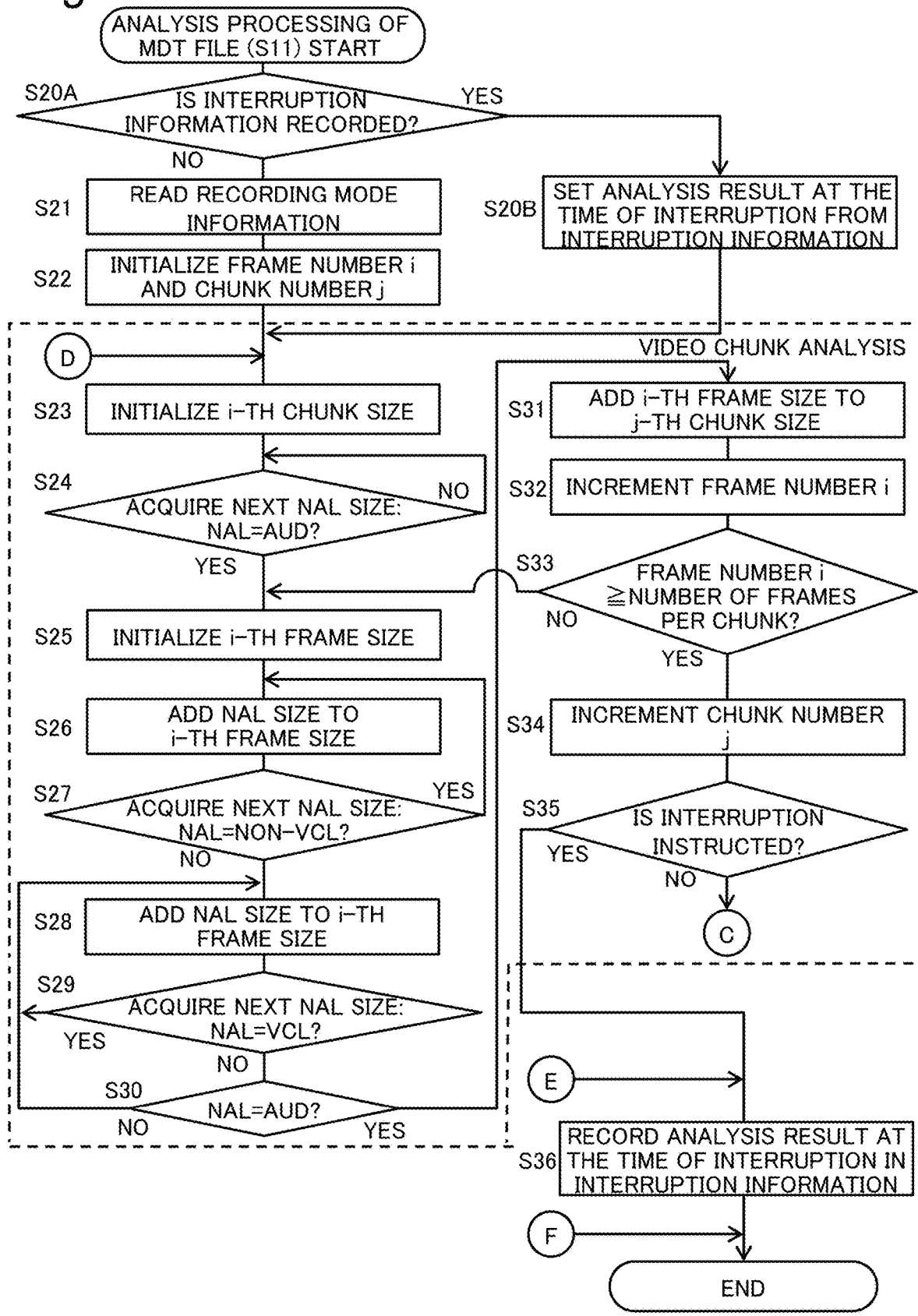
FIG. 15 is a flowchart illustrating analysis processing of a MDT file in a digital camera of a second embodiment.

FIG. 15 is a flowchart illustrating analysis processing of a MDT file (S11A) in the digital camera 100 of the present embodiment. The digital camera 100 according to the present embodiment performs processing for restarting the interrupted repair processing (S20A, S20B, S36) in addition to the processing (S23 to S35, S37 to S41) similar to the analysis processing of a MDT file (S11) according to the first embodiment.

In the present embodiment, when the interruption is instructed (YES in S35), the controller 135 records the analysis result up to the time of interruption in interruption information stored in the memory card 142 or the like (S36). The interruption information includes an analysis position at the time of interruption in addition to information similar to the analysis result recorded in step S41 at the time of completion of the repair processing, for example. The analysis position is recorded by an address according to a position in the MDT file D1 at which the analysis result for each chunk is already obtained, for example.

Also in a case where the interruption is instructed in the processing of analyzing the chunk of audio (S37 to S40 in FIG. 10B) (YES in S40), the controller 135 proceeds to step S36 and records the interruption information as in the case of video. After recording the interruption information (S36), the controller 135 ends the processing of this flowchart.

Thereafter, the controller 135 receives a user operation giving the repair instruction on a corrupted file for which the repair processing is interrupted, the user operation selecting the corrupted file as the repair target again (S5, S6). In this case, in the MDT file analysis process (S11A) according to the present embodiment, processing in steps S20A and S20B are performed, instead of reading the recording mode information (S21) and initializing the frame number i and the chunk number j (S22) according to the first embodiment.

First, the controller 135 determines, referring to the memory card 142, whether or not the interruption information at the time of previously performing the analysis processing of a MDT file (S11A) is recorded for the MDT file D1 being analyzed, for example (S20A).

When the interruption information is recorded (S20A), the controller 135 sets the analysis result at the time of interruption to various variables and the like, referring to the interruption information (S20B). For example, the recording mode information, the frame number i, the chunk number j, the array of the frame size, the array of the chunk size, the number of chunks of the video, the number of chunks of the sound, and the analysis position are set from the interruption information.

Thereafter, the controller 135 performs the processing in and after step S23 using the analysis result up to the time of interruption.

On the other hand, when the interruption information is not stored (NO in S20A), the recording mode information is read (S21), and the subsequent analysis processing is performed, similarly to the analysis processing of a MDT file in the first embodiment (S11).

According to the above processing, when the interruption information is recorded (YES in S20A), the analysis of the MDT file D1 is restarted from the interrupted analysis position based on the interruption information (S20B). Therefore, it is possible to shorten time required for the repair after the interruption, and it is not necessary to perform the repair processing again from the beginning of D1 of the MDT file even when the repair processing is interrupted. This can facilitate more for the user to use the interruption of the repair. As described above, it is possible to further improve user convenience regarding the repair to the moving image file in the digital camera 100.

As described above, in the present embodiment, after interrupting the repair processing on the specific corrupted file, the controller 135 receives, via the operation interface 150, a user operation instructing restart of the repair processing on the specific corrupted file, and restarts the repair processing on the specific corrupted file in response to the user operation instructing the restart (S5, S6) (S20A, S20B). Therefore, it is not necessary to perform the repair processing again from the head of the MDT file D1 in which the repair processing is interrupted, and duplicated repair processing can be avoided, for example. In addition, it is possible to make it easier for the user with restart in mind to instruct interruption of the repair processing. As described above, it is possible to facilitate repair to the moving image file in the digital camera 100.

Other Embodiments

As described above, the first and second embodiments are described as examples of the technology disclosed in the present application. However, the technology in the present disclosure is not limited to this, and can also be applied to embodiments in which changes, substitutions, additions, omissions, and the like are made as appropriate. In addition, a new embodiment can be made by combining the components described in the above embodiments.

In the first embodiment described above, an example is described in which the repair remaining time is displayed by the progress bar 65 or the like when the repair processing to a moving image file (S7) is in execution in the digital camera 100 (see FIGS. 8C, 14A and 14B). In the present embodiment, not only when the step S7 is in execution, but also when a repairable file is displayed (S4), the time required for repair may be displayed, for example. Such a modification of the first embodiment will be described with reference to FIG. 16.

Figure 16:
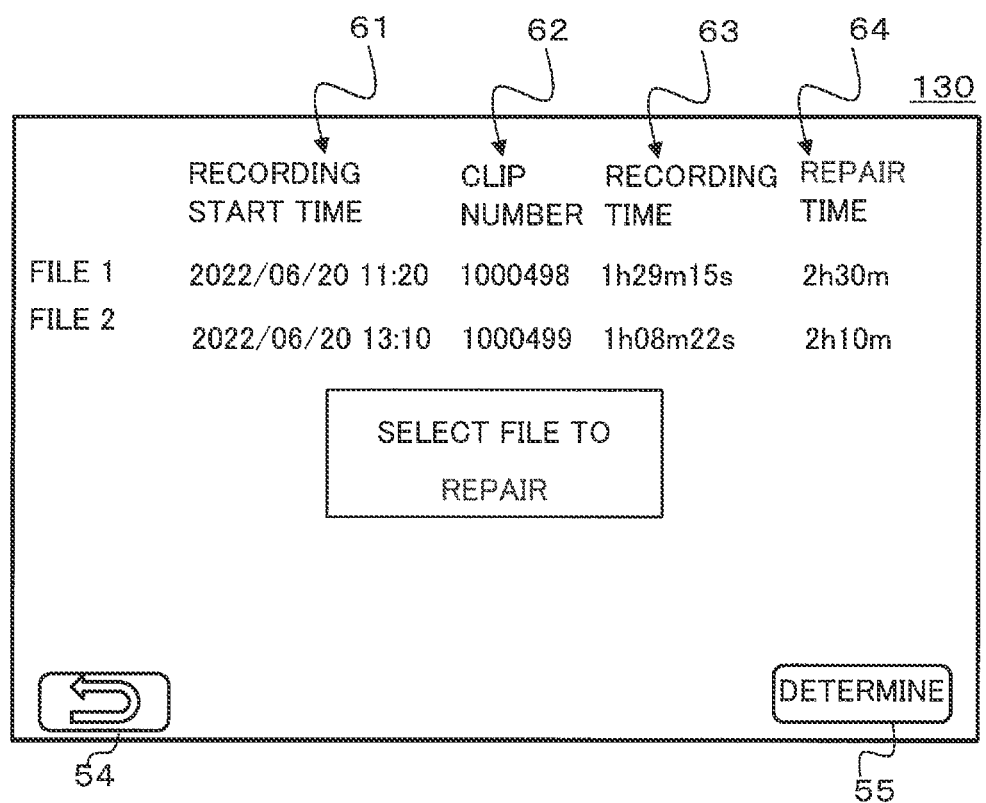
FIG. 16 is a view illustrating a display example of a repair time in a digital camera according to a modification of the first embodiment.

FIG. 16 illustrates a display example of the repair time in the digital camera 100 according to the modification of the first embodiment. In the display example of FIG. 16, the display monitor 130 displays a "repair time" for each file of the options, in addition to the items similar to those in FIG. 8B of the first embodiment, on the screen for selecting the file to be repaired (S4). The repair time indicates the time from the start to the completion of the repair processing. In the digital camera 100 of the present modification, when extracting the file information (S3), the controller 135 calculates an estimated value of the repair time in addition to the recording time of each file, for example.

For example, the digital camera 100 according to the present modification may store in advance a table in the flash memory 145 or the like, the table associating a measured value of a time taken to repair a file with the recording mode information such as a recording time of the file and a frame rate of video. The controller 135 can calculate the estimated value of the repair time by referring to the table and the recording mode information in each MDT file D1 of the options, for example.

As described above, in the present modification, before performing the repair processing on a specific corrupted file, the controller 135 causes the display monitor 130 to display the repair time as an example of information indicating the execution time of the repair processing (S4). This can make it easier for the user to determine whether or not to give the repair instruction on a specific corrupted file (see S6).

In each of the above embodiments, the controller 135 causes the display monitor 130 to display the repair remaining time (see FIGS. 8C, 14A and 14B) or the repair time (see FIG. 16) respectively as an example of information indicating the execution time of the repair processing on or before (S7 or S4) performing the repair processing on a specific corrupted file. Such display of the execution time is not limited to one of on and before performing the repair processing, and may be performed both on and before performing the repair processing.

In each of the above embodiments, an example is described in which, in the extraction of the file information (S3), a file having an extension "MDT" is extracted as an option of the repair target. Further, in the present embodiment, referring to the recording mode information of the MDT file D1, only a file in one container format may be extracted according to whether the container format is MOV or MP4, for example. For example, only a file in MOV format may be extracted and displayed as a repairable file (S4).

In each of the above embodiments, an example of alternately analyzing each chunk of the video and the sound in the MDT file analysis processing (S11, S11A) is described (S23 to S35, S37 to S40). In the present embodiment, the digital camera 100 may determine whether or not the audio data is in an analyzable format before execution of step S37, referring to the recording mode information of the MDT file D1, for example. For example, when the audio data is recorded in a format different from the LPCM, the MDT file analysis processing (S11, S11A) may ends without performing the processing in and after step S37, or only the chunk of the video may be analyzed. Further, the above determination may be made when the recording mode information is read (S21).

In each of the above embodiments, as illustrated in FIG. 11A, an example is described in which the recording mode information is stored at the head of the MDT file D1. The recording mode information may be recorded in a file different from the MDT file D1, and in the present embodiment, the recording mode information is recorded in a text file or the like in the memory card 142, for example. Furthermore, the recording mode information may include information other than the information illustrated in FIG. 11C, or may include only a part of the information of FIG. 11C. For example, a recording mode according to a combination of image quality, a frame rate, a bit rate, and the like of a moving image may be set in advance, and a database may be stored in the flash memory 145 or the like to be referred to as the recording mode information, the database associating the recording mode with other information.

In each of the above embodiments, an example is described in which, when the repair is interrupted in the repair processing to a moving image file (S7) (YES in S12), the repair processing ends without performing the processing related to the generation of the moving image file Dm (S13, S14). In the present embodiment, when the repair is interrupted (YES in S12), the MVD file Dh may be generated based on the analysis result of the MDT file D1 up to the interruption by the processing similar to steps S13 and S14, and a moving image file Dm may be generated to be reproducible up to the time when the MDT file D1 is already analyzed. In addition, even when an analysis error or the like occurs in the analysis of the MDT file D1, the repair may be performed, similarly to the case of the interruption, using the analysis result up to the time point at which the error occurs.

In each of the above embodiments, an example is described in which the interruption information is recorded in the memory card 142 in the analysis processing of a MDT file (S11, S11A). In the present embodiment, the interruption information may be recorded in a nonvolatile recording medium in the main body of the digital camera 100 such as the flash memory 145.

In each of the above embodiments, an example is described in which, in the analysis processing of a MDT file (S11, S11A), it is determined whether or not the interruption is instructed, for each chunk of video and sound, for example (S35, S40). In the present embodiment, the presence or absence of the interruption instruction may be determined not only for each chunk but also at a period for each NAL unit or frame, or the determination may be made at a period larger than a period corresponding to one chunk. In addition, when the interruption is instructed in a case where it is assumed that the repair completes soon, such as a case where the repair remaining time calculated in the processing illustrated in FIG. 12 is less than a predetermined time, a message or the like asking the user whether or not to perform the interruption may be displayed on the display monitor 130, for example.

In each of the above embodiments, the digital camera 100 capable of interrupting the repair processing is described, but there may be a case not receiving a user operation for the interruption. In this case, in the analysis processing of a MDT file (S11) similar to that of the first embodiment, the processing related to interruption (S35, S36, S40) may not be performed, for example.

In each of the above embodiments, the digital camera 100 that records a moving image file in the memory card 142 is described as an example of the recording medium. The digital camera 100 according to the present embodiment may record a moving image file, not limited to the memory card 142, but in an external recording device such as a solid state drive (SSD) as a recording medium. Furthermore, the digital camera 100 may record a moving image file in an external recording device such as a data server via a communication network by the communication module 155, and may perform the repair operation to the moving image file recorded in such an external recording device, for example. Such various external recording devices are examples of a recording medium in the present embodiment.

In each of the above embodiments, the example in which the digital camera 100 displays the selection screen of the corrupted file (FIG. 8B) and the like on the display monitor 130 is described, but the present disclosure is not limited thereto. For example, the digital camera 100 of the present embodiment may display a selection screen similar to that in FIG. 8B on an external display or the like via the communication module 155.

In each of the above embodiments, the digital camera 100 including the optical system 110 and the lens driver is exemplified. The imaging apparatus of the present embodiment does not need to include the optical system 110 and the lens driver, and may be an interchangeable lens type camera, for example.

In each of the above embodiments, the digital camera 100 is described as an example of the imaging apparatus, but the present disclosure is not limited thereto. The imaging apparatus of the present disclosure may be an electronic device (e.g., a video camera, a smartphone, a tablet terminal, or the like) having a moving image photographing function.

In each of the above embodiments, an example in which the operation of moving image repair is performed in the imaging apparatus is described, but the present disclosure is not limited thereto. The technology of the present disclosure is not limited to the imaging apparatus, and may be implemented in an information processing device having no moving image photographing function. An information processing device according to the present embodiment includes: a controller that performs repair processing generating a moving image file from a corrupted file, the moving image being capable of reproducing a moving image indicated by imaging data generated by imaging a subject image, the corrupted file having a defect as the moving image file; and an user interface that inputs a user operation related to the repair processing. The controller receives a user operation selecting a specific corrupted file from one or more of corrupted files via the user interface, and performs the repair processing on the selected corrupted file in response to the user operation.

This also facilitates repair on the corrupted moving image file for the user of the information processing device, as in each of the above embodiments.

As described above, the embodiments are described as examples of the technique in the present disclosure. For the technique, the accompanying drawings and detailed description are provided.

Thus, the components described in the accompanying drawings and the detailed description may include not only indispensable components for problem-solving, but also dispensable components for problem-solving, to exemplify the above technique. Because of this, it should not be immediately recognized that the dispensable components are indispensable when the dispensable components are described in the accompanying drawings and detailed description.

Aspects of Present Disclosure

As described above, the present disclosure includes following aspects.

1. An imaging apparatus includes an image sensor that captures a subject image to generate imaging data; a controller that performs repair processing to generate a moving image file from a corrupted file, the moving image file being capable of reproducing a moving image indicated by the imaging data, the corrupted file having a defect as the moving image file; and a user interface that inputs a user operation related to the repair processing. The controller receives a user operation selecting a specific corrupted file from one or more of corrupted files via the user interface, and performs the repair processing on the selected corrupted file in response to the user operation.
2. The imaging apparatus according aspect 1, further includes a display that displays information, wherein the controller acquires file information on each corrupted file from a recording medium in which the one or more of corrupted files are stored, in response to a predetermined menu operation in the user interface, and causes the display to display the acquired file information.
3. In the imaging apparatus according aspect 2, the controller receives the user operation selecting the specific corrupted file via the user interface, with the acquired file information being displayed on the display.
4. In the imaging apparatus according aspects 2 or 3, the file information includes at least one of a recording start time, a recording time, an identification number, or a file name of the corrupted file.
5. The imaging apparatus according any one of aspects 1 to 4, further includes a display that displays information, wherein the controller causes the display to display information indicating an execution time of the repair processing, on or before performing the repair processing on the specific corrupted file.
6. In the imaging apparatus according any one of aspects 1 to 5, the controller receives, on performing the repair processing on the specific corrupted file, a user operation instructing interruption of the repair processing via the user interface, and interrupts the repair processing on the specific corrupted file in response to the user operation instructing the interruption.
7. In the imaging apparatus according aspect 6, the controller receives, after interrupting the repair processing on the specific corrupted file, a user operation instructing restart of the repair processing on the specific corrupted file via the user interface; and restarts the repair processing on the specific corrupted file in response to the user operation instructing the restart.
8. In the imaging apparatus according any one of aspects 1 to 7, the defect in the corrupted file is corruption in management information used for reproducing the moving image, and the controller performs the repair processing on the corrupted file by generating, based on the corrupted file, the management information.

The present disclosure is applicable to an imaging apparatus that records a moving image file on a recording medium.

What is claimed is:

1. An imaging apparatus comprising:
   an image sensor that captures a subject image to generate imaging data;
   a controller that performs repair processing to generate a moving image file from a corrupted file, the moving image file being capable of reproducing a moving image indicated by the imaging data, the corrupted file having a defect as the moving image file; and
   a user interface that inputs a user operation related to the repair processing, wherein
   the controller
      receives a user operation selecting a specific corrupted file from one or more of corrupted files via the user interface, and
      performs the repair processing on the selected corrupted file in response to the user operation.

2. The imaging apparatus according to claim 1, further comprising a display that displays information, wherein
   the controller
      acquires file information on each corrupted file from a recording medium in which the one or more of corrupted files are stored, in response to a predetermined menu operation in the user interface, and
      causes the display to display the acquired file information.

3. The imaging apparatus according to claim 2, wherein the controller receives the user operation selecting the specific corrupted file via the user interface, with the acquired file information being displayed on the display.

4. The imaging apparatus according to claim 2, wherein the file information includes at least one of a recording start time, a recording time, an identification number, or a file name of the corrupted file.

5. The imaging apparatus according to claim 1, further comprising a display that displays information, wherein
   the controller causes the display to display information indicating an execution time of the repair processing, on or before performing the repair processing on the specific corrupted file.

6. The imaging apparatus according to claim 1, wherein the controller
   receives, on performing the repair processing on the specific corrupted file, a user operation instructing interruption of the repair processing via the user interface, and
   interrupts the repair processing on the specific corrupted file in response to the user operation instructing the interruption.

7. The imaging apparatus according to claim 6, wherein the controller
   receives, after interrupting the repair processing on the specific corrupted file, a user operation instructing restart of the repair processing on the specific corrupted file via the user interface; and
   restarts the repair processing on the specific corrupted file in response to the user operation instructing the restart.

8. The imaging apparatus according to claim 1, wherein the defect in the corrupted file is corruption in management information used for reproducing the moving image, and
   the controller performs the repair processing on the corrupted file by generating, based on the corrupted file, the management information.

* * * * *